(12) United States Patent
Clune

(10) Patent No.: US 7,877,248 B1
(45) Date of Patent: Jan. 25, 2011

(54) MODIFYING BLOCK PARAMETERS IN A DISCRETE EVENT EXECUTION DOMAIN

(75) Inventor: Michael I. Clune, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 1166 days.

(21) Appl. No.: 11/021,781

(22) Filed: Dec. 23, 2004

Related U.S. Application Data

(60) Provisional application No. 60/611,573, filed on Sep. 20, 2004.

(51) Int. Cl.
G06F 17/50 (2006.01)

(52) U.S. Cl. .............................. 703/13; 703/6; 703/14; 703/15; 703/16; 703/17

(58) Field of Classification Search ................ 703/6, 703/13–17
See application file for complete search history.

(56) References Cited

U.S. PATENT DOCUMENTS

| 4,985,860 | A | | 1/1991 | Vlach | |
|---|---|---|---|---|---|
| 5,852,449 | A | * | 12/1998 | Esslinger et al. | 345/473 |
| 6,445,679 | B1 | * | 9/2002 | Taniguchi et al. | 370/232 |
| 6,457,164 | B1 | * | 9/2002 | Hwang et al. | 716/8 |

OTHER PUBLICATIONS

The MathWorks, Inc., "Stateflow User's Guide, Version 4", The MathWorks, Inc., Sep. 2000.*

Hales et al., "Enport Model Builder: An Improved Tool for Multiport Modeling of Mechatronic Systems", Proc. Intl. Conf. On Bond Graph Modeling, 2001.*

Dynasim AB, "Dymola Dynamic Modeling Laboratory User's Manual Version 5.0", Dynasim AB, 2002, 275 pages.*

Anylogic User's Manual. *XJ Technologies Company Ltd.* 1992-2004; pp. 2-4, 8-9, 21-3, 41-3, 55-7, 155-6, 218-21, 270-1.

Clune, M., et al. "Panel session on Challenges and solution techniques for hybrid simulation." 43rd IEEE Conference on Decision and Control, Dec. 14, 2004.

Extend™ Users Manual. "Simulation software for the new millennium." Chapters 1-5, pp. 35-156; Appendix F, pp. 579-662, 1997.

(Continued)

*Primary Examiner*—Kamini Shah
*Assistant Examiner*—Herng-Der Day
(74) *Attorney, Agent, or Firm*—Nelson Mullins Riley & Scarborough LLP; Kevin J. Canning

(57) ABSTRACT

A discrete event system (DES) modeling environment models the occurrence of events independent of continuous model time. In a DES modeling environment, state transitions depend not on time, but rather asynchronous discrete incidents known as events. A user may customize selected parameters of a block or other component able to support at least one entity passing therethrough holding a value of arbitrary data type in a DES modeling environment. For example, a user can enable and disable ports a discrete event execution block in a discrete event execution model using a graphical user interface, such as a dialog box. Based on user-selected dialog inputs, a discrete event execution program can automatically update a specification for a block, for example, by adding ports to the graphical representation of the block.

42 Claims, 16 Drawing Sheets

OTHER PUBLICATIONS

Fall, K., et al. "The ns manual (formerly ns notes and documentation)." *The VINT Project*. Apr. 14, 2005; Chapters 4-8, pp. 37-85; Chapter 11, pp. 110-4.

Fujimoto, R. "Parallel discrete event simulation." *Communications of the ACM*. Oct. 1990; 1-8.

"Fundamentals of VHDL-AMS for high-speed buffer modeling." *Mentor Graphics Corporation*. 2002; 1-62.

"Graphical design environment for CAMeL-Tools." http://wwwcs.uni-paderborn.de/SFB376/projects/c1/Paper/vcamel.html. Sep. 18-20, 1996; 1-10.

Haverinen, A., et al. "White paper for SystemC™ based SoC communication modeling for the OCP™ protocol." Oct. 14, 2002; 1-39.

Henricksson, D., et al. "TrueTime 1.2—Reference Manual." Oct. 2004; 7-79.

Holz, E. "SDL-2000 Tutorial." *Formal Methods Europa*. Mar. 2001; 1-49.

Liu, J., et al. "Component-based hierarchical modeling of systems with continuous and discrete dynamics." *CACSD'00*. Sep. 25, 2000; 1-10.

Liu, J., et al. "Actor-oriented control system design: A Responsible framework perspective." *IEEE Transactions on Control Systems Technology*. Mar. 2004; 12(2):250-62.

Liu, J. et al. "Motivating hierarchical run-time models for measurement and control systems." *Ptolemy Miniconference*, Berkeley, CA. Mar. 22-23, 2001; 1-3.

Liu, J., et al. "System-level modeling of continuous and discrete dynamics." *Ptolemy Miniconference*, Berkeley, CA. Mar. 22-23, 2001; 1-4.

Martin, D.E., et al. "Analysis and simulation of mixed-technology VLSI systems." *Journal of Parallel and Distributed Computing*. 2002; 62:468-93.

Martin, R.C. "UML tutorial: Sequence diagrams." *Engineering Notebook Column*. Apr. 1998; 1-5.

Murata, T. "Petri nets: Properties, analysis and applications." *Proceedings of the IEEE*. Apr. 1989; 77(4):541-80.

Overhauser, D., et al. "Evaluating mixed-signal simulators." *IEEE*. 1995; 113-20.

Overhauser, D., et al. "IDSIM2: An Environment for mixed-mode simulation." *IEEE*. 1990; 5.2.1-4.

"Ptolemy II Frequently Asked Questions." http://ptolemy.eecs.berkeley.edu/ptolernyll/ptIlfag.html. 1-10, 2005.

System C Version 2.0 Users Guide. "Update for SystemC 2.0.1." 1996-2002; Chapter 1, pp. 1-8; Chapter 2, pp. 9-38; Chapter 5, pp. 71-82.

"The Almagest. vol. 1-Ptolgemy 0.7 User's Manual." *Ptolemy*. Mar. 3, 1997; Sections 1.4-1.9, 2.5-2.8, 4.9, 9.1-9.5, 12.1-12.4, 16.1, 16.3.

Vlach, M. "Modeling and simulation with Saber." *IEEE*. 1990; T-11. 1-11.9.

Zeigler, B.P., et al. "Creating simulations in HLA/RTI using the DEVS modeling framework." *DEVS/HLA Tutorial*. 1998; 1-18.

Bailey, Stephen A. et al., "1076.1 Ballot Resolution Committee, Comment Resolution Report," retrieved online at http://www.eda.org/vhdl-ams-ftp_files/lang_design/BRC/CRR15_Meta_issues.txt (2005).

Chen, Gilbert et al., "Lookahead, Rollback and Lookback: Searching for Parallelism in Discrete Event Simulation," retrieved online at http://citeseer.ist.psu.edu/551717.html (2002).

Connell, Jon et al., "Early Hardware/Software Integration Using SystemC 2.0," retrieved online at http://www.synopsys.com/products/designware/system_studio/esc_paper_552.pdf (2002).

Grand Valley State University, "20. Sequential Function Charts," retrieved online at http://www.eod.gvsu.edu/~jackh/books/plcs/chapters/plc_sfc.pdf, 2005.

Grötker, Thorsten, "SystemC, Transaction Level Modeling with SystemC," Synopsys, Inc., retrieved online at http://www-ti.informatik.uni-tuebingen.de/~systemc/Documents/Presentation-7-TLM_groetker.pdf (2002).

Hzeeland.nl, "Introduction to VHDL—A Tutorial," retrieved online at http://www.hzeeland.n1/~wrijker/dsy/vhdl/algemvhdl/fcmi/vhdlintro.html (2005).

Information Science Institute, "The Network Simulator—ns-2," retrieved online at http://www.isi.edu/nsnam/ns/ (2005).

International Engineering Consortium," Specifications and Description Language (SDL)," retrieved online at http://www.iec.org/online/tutorials/acrobat/sdl.pdf (2005).

Mosterman, Pieter J. et al., "Modeling Petri Nets as Local Constraint Equations for Hybrid Systems Using Modelica™," retrieved online at http://citeseer.ist.psu.edu/359408.html (1998).

OPNET Technologies, Inc., "Modeler, Accelerating Network R&D," retrieved at www.opnet.com (2004).

Perumalla, Kalyan et al., "Using reverse circuit execution for efficient parallel simulation of logic circuits," retrieved online at http://www.cc.gatech.edu/~kalyan/papers/rccircuit-spie02.pdf (2001).

Rensselaer Polytechnic Institute,"Parallel Discrete Event Simulation," retrieved online at http://www.rpi/edu/~gucluh/pdes.html (2005).

Rockwell Automation, "IEC 1131 Sequential Function Charts," retrieved online at http://www.software.rockwell.com/corporate/reference/lec1131/sfc.cfm (2007).

SIMUL8 Corporation, "SIMUL8 Feature Tour," retrieved online at http://www.simul8.com/products/features/ (2005).

SIMUL8 Corporation, "SIMUL8 Professional—Normally $4995 but $3995 til May 31," retrieved online at http://simul8-online.com/products/s8prof.htm (2005).

Siegmund, Robert et al., "Efficient Modeling and Simulation of Data Communication Protocols in Communication-oriented Designs using the SystemCSV Extension," European SystemC Users Group Meeting Copenhagen 2001, Powerpoint presentation (2001).

\* cited by examiner

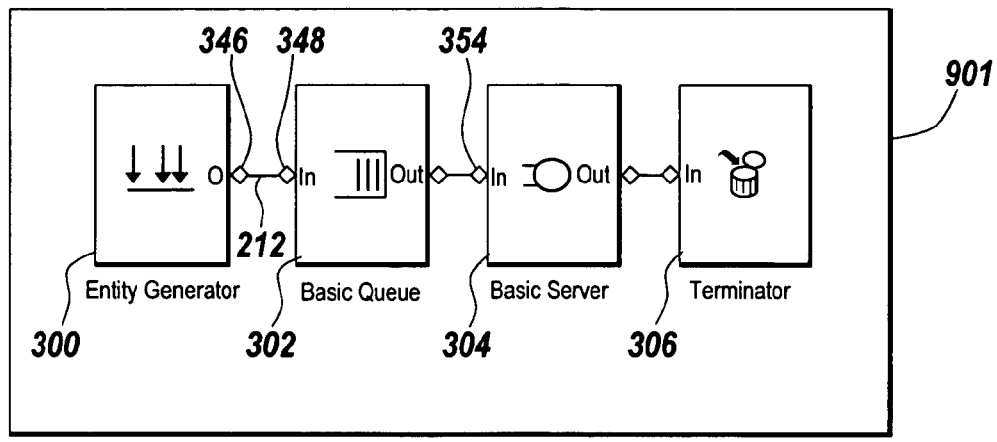
*Fig. 8*
| Time of Event (s) | Type of Event |
|---|---|
| 0.9 | Entity Generator block generates an entity |
*Fig. 9*
| Time of Event (s) | Type of Event |
|---|---|
| 1.7 | Entity Generator block generates second entity |
| 2.2 | Basic Server block completes service on the first entity |
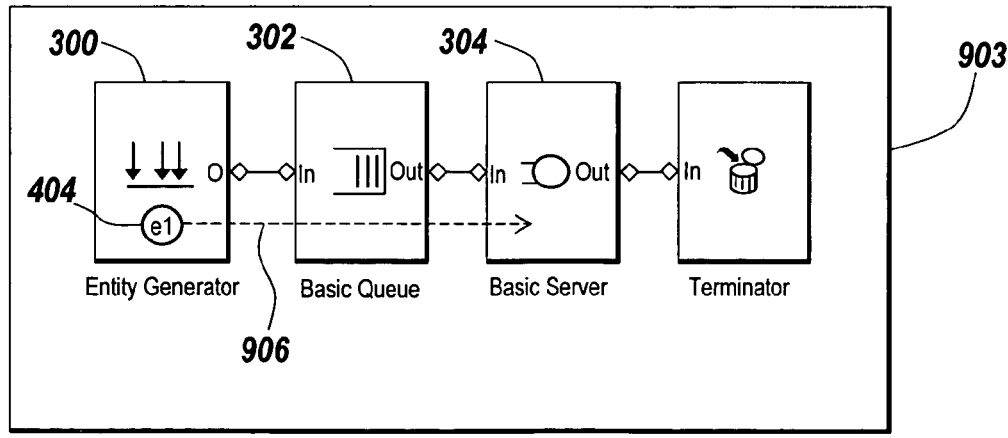
*Fig. 10*

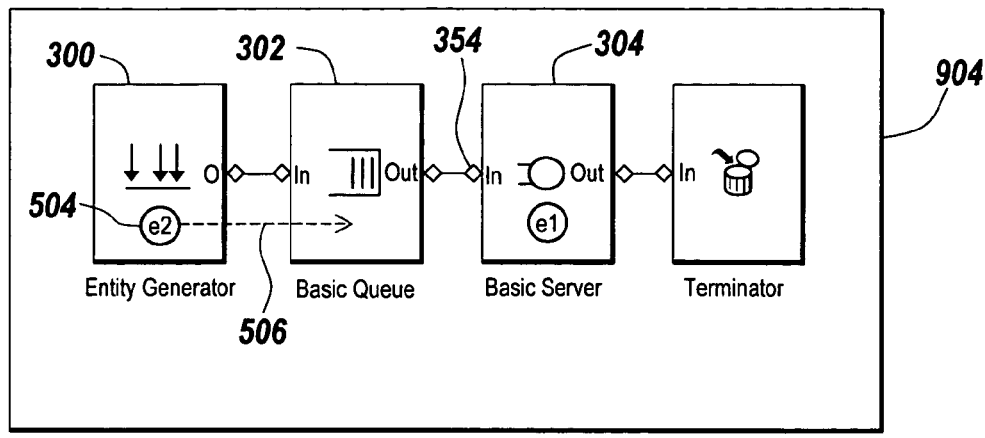
*Fig. 11*
| Time of Event (s) | Type of Event |
|---|---|
| 2.2 | Basic Server block completes service on the first entity |
| 3.8 | Entity Generator block generates the third entity |
*Fig. 12*
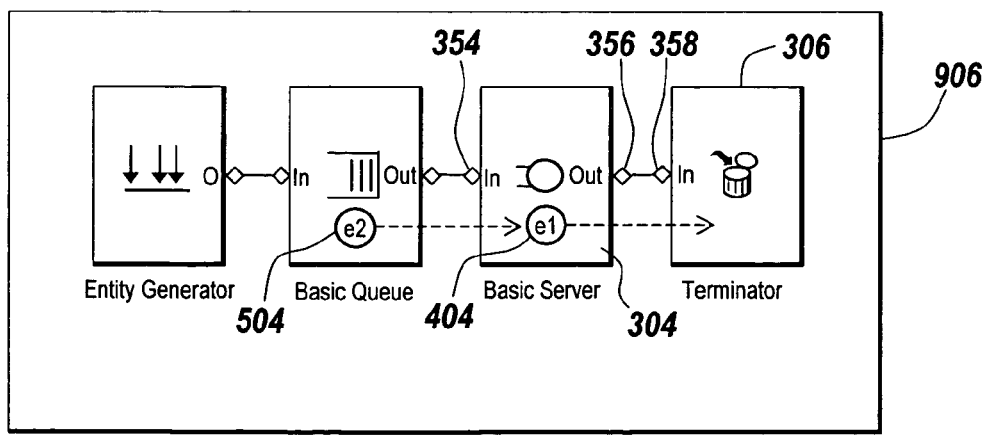
*Fig. 13*

| Time of Event (s) | Type of Event |
|---|---|
| 3.8 | Entity Generator block generates the third entity |
| 4.2 | Basic Server block completes service on the second entity |

| Time of Event (s) | Type of Event |
|---|---|
| 3.9 | Entity Generator block generates the fourth entity |
| 4.2 | Basic Server block completes service on the second entity |

| Time of Event (s) | Type of Event |
|---|---|
| 4.2 | Basic Server block completes service on the second entity |
| 6 | Entity Generator block generates the fifth entity |

| Time of Event (s) | Type of Event |
|---|---|
| 4.9 | Basic Server block completes service on the third entity |
| 6 | Entity Generator block generates the fifth entity |

*Fig. 19*

| Time of Event (s) | Type of Event |
|---|---|
| 2.1 | Entity Generator block generates the first entity |
| 2.1 | Entity Generator block generates the second entity |
| 2.3 | Basic Server block completes service |

*Fig. 20a*

| Time of Event (s) | Type of Event | Priority |
|---|---|---|
| 2.1 | Entity Generator block generates the first entity | 1 |
| 2.1 | Entity Generator block generates the second entity | 2 |
| 2.3 | Basic Server block completes service of third entity | 3 |

*Fig. 20b*

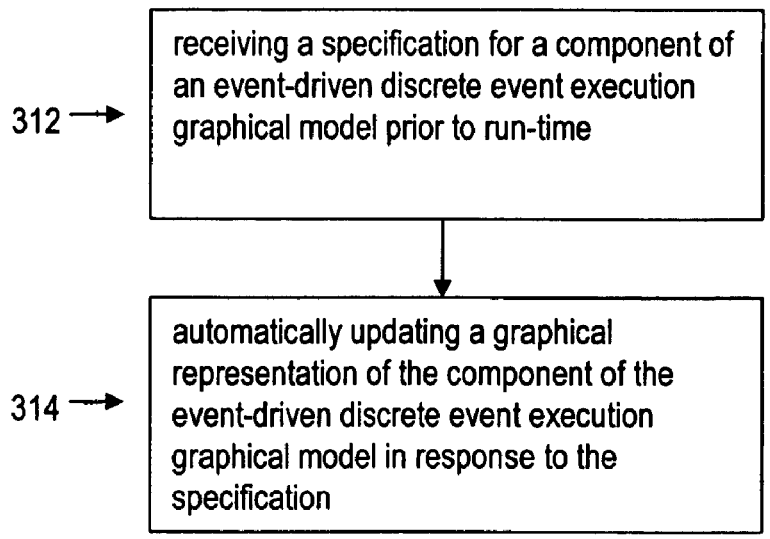
Fig. 31
Fig. 32
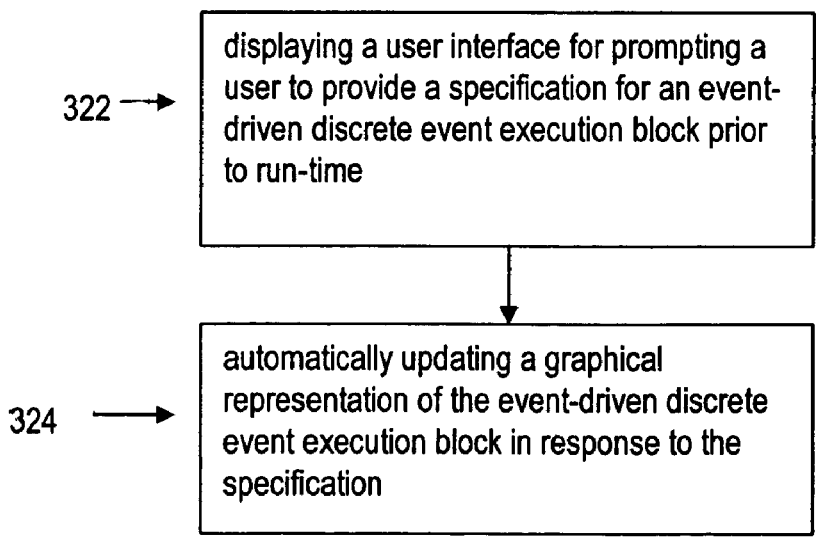

MODIFYING BLOCK PARAMETERS IN A DISCRETE EVENT EXECUTION DOMAIN

RELATED APPLICATIONS

The present application claims priority to U.S. Provisional Patent Application Ser. No. 60/611,573, entitled "Modifying Block Ports in a Discrete Event Simulation Domain", filed Sep. 20, 2004, the contents of which are herein incorporated by reference.

FIELD OF THE INVENTION

The present invention relates to modeling of discrete time events using a graphical modeling system. More particularly, the present invention relates to configuring parameters of a block in a graphical model used to model discrete time events.

BACKGROUND OF THE INVENTION

Generally, graphical analysis, simulation and execution methods are used in modeling, design, analysis, and synthesis of engineered systems. These methods provide a visual representation of a model, such as a block diagram. The visual representation provides a convenient interpretation of model components and structure. The visual representation also provides a quick intuitive notion of system behavior. The components of a block diagram can also capture the mathematical representation of the actual system being modeled.

Historically, time-based block diagram models have been used in scientific areas, such as Feedback Control Theory and Signal Processing. Time-based block diagrams are used to study, design, debug, and refine dynamic systems representative of many real-world systems. A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, and so on. Examples of man-made or engineered dynamic systems include: a bouncing ball, a spring with a mass tied on an end, automobiles, airplanes, control systems in major appliances, communication networks, audio signal processing, nuclear reactors, a stock market, and the like.

Professionals from diverse areas such as engineering, science, education, and economics build mathematical models of dynamic systems to better understand system behavior as it changes with the progression of time. The mathematical models aid in building better systems, which can be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may serve to educate users on the basic principles governing physical systems. The models and results are often used as a scientific communication medium between humans. The term "model-based design" refers to the use of graphical models in the analysis, development, validation, and operation of dynamic systems.

Dynamic systems are typically modeled in modeling environments as sets of differential, difference, and/or algebraic equations. At any given instant of time, these equations may be viewed as relationships between the system's output response ("outputs"), the system's input stimuli ("inputs") at that time, the current state of the system, the system parameters, and time.

Time-based block diagram modeling has become particularly attractive over the last few years with the advent of software packages to process large amounts of data and perform a high number of computational iterations. In fact, various classes of graphical models enable a user to describe a system and related computations that can be performed on application specific computational hardware, such as a computer, microcontroller, FPGA, or custom hardware. Classes of such graphical models include time-based block diagram execution applications such as Simulink® from the MathWorks, Inc. Natick Mass., and state-based flow diagram execution applications such as Stateflow® from the MathWorks, Inc. Natick Mass., in addition to other models, such as data flow diagrams, UML, VHDL, analog extension and the like.

A common characteristic among these various forms of block diagram execution applications is that they define semantics of how to execute the diagram, and thus they specify how to model a dynamic system. Such applications provide sophisticated software platforms with a rich suite of support tools that make the analysis and design of dynamic systems efficient, methodical, and cost-effective. Furthermore, such applications can support the modeling of linear and nonlinear systems. The systems may be modeled in continuous time, sampled (or discrete) time, or a hybrid of continuous and discrete time. Systems can also be multirate, i.e., have different parts that are sampled or updated at different rates.

Time can be an inherited component of block diagram execution applications in that the results of a block diagram execution are dependent on time and as such, vary with time. In other words, a block diagram execution or model represents the instantaneous behavior of a dynamic system and models that system over time. Determining a system's behavior over time requires repeatedly executing a model of the system at intervals, called time steps, from the start of the time span to the end of the time span.

Systems may be categorized by the type of time step being used (fixed-step or variable-step). A fixed-step system is one that uses a fixed-step solver. A variable-step system is one that uses a variable-step solver. A solver is a module of the execution engine that is responsible for performing two tasks: (1) determining how far execution time should be advanced between consecutive passes through a system in order to accurately trace the system's outputs, and (2) integrating the derivative of the states of the system to obtain the actual states. Based on how solvers perform the first task, they are generally classified into two basic classes: Fixed-step solvers or Variable-step solvers. Fixed-step solvers often use explicit methods to compute the next continuous state at fixed periodic intervals of time. A variable-step solver can use either implicit or explicit methods to compute the next continuous state at non-periodic intervals of time. Generally, variable-step solvers use a form of error control to adjust the interval size such that the desired error tolerances are achieved.

Solvers can also be categorized into two classes with respect to time: continuous-time solvers and discrete-time solvers. Continuous-time solvers use numerical integration to compute a model's continuous states at the current time step from the states at previous time steps and the state derivatives. Continuous-time solvers rely on the model's blocks to compute the values of the model's discrete states at each time step. Mathematicians have developed a wide variety of numerical integration techniques for solving the ordinary differential equations (ODEs) that represent the continuous states of dynamic systems. Continuous-time solvers can further be separated into fixed-step continuous-time solvers and variable-step continuous-time solver. Discrete-time solvers exist primarily to solve purely discrete models, and compute only the next execution time step for a model and nothing else. Discrete-time solvers do not compute continuous states and they rely on the model's blocks to update the model's discrete states. Similarly, discrete-time solvers can also be further separated into fixed-step discrete-time solvers and variable-step discrete-time solvers.

Simulink® is an example of an interactive graphical modeling tool that enables users to quickly create, model, simulate, and test block diagram representations of dynamic systems. Simulink® uses time-dependent models. It is suitable for simulating time-varying systems. FIG. 1 shows an example of a Simulink® model. The Simulink® model makes use of blocks and arrows to connect the blocks, when forming the model. Each arrow connecting one enabled block to another represents a signal having a value at all times. The arrow indicates the direction of the signal as the signal varies with time.

In time-based models, in order to know what happens with the system at a specific time in the future (such as at time equals 1000 seconds) the model must be initiated at a time of n seconds, where n is less than 1000 and the behavior at time n is known, and stepped through time to arrive at the 1000 second mark. For example, the model can be executed as follows in accordance with one example implementation embodiment. Input signal 100 generates an input signal and sends the signal to a Sum block 102 via link 110. Sum block 102 adds the signal from link 110 and a second link 116 and outputs the result in the form of link 112. At execution start time, link 116 has a signal of value zero. Integrator block 104 takes the signal from link 112 and performs integration on the input signal and outputs the result through link 114. Link 114 communicates the signal from the Integrator block 104 to a Scope block 108 for display, and also sends the signal to a Gain block 106 through link 116. Gain block 106 performs calculation on the input signal from link 114 and outputs the result through link 118 back to the Sum block 102. The Sum block 102 adds the signal from link 110 and the new updated signal from link 118 and outputs the result through link 112 to the Integrator block 104. The Integrator block 104 takes the updated signal from link 112 and performs integration on the value forwarded by the signal to produce an updated output on link 114. The model continues on until a predetermined condition is achieved, a time period is attained, or the user interrupts the execution.

Dynamic systems can also be modeled from a state-based perspective. The state of the system may be thought of as a numerical representation of the dynamically changing configuration of the system. For instance, in a model of a simple pendulum, the state may be viewed as the current position and velocity of the pendulum. Similarly, in a model of a signal-processing system that filters a signal, the state would be a set of previous inputs. The system parameters are the numerical representation of the static, or unchanging, configuration of the system and may be viewed as constant coefficients in the equations modeling the system. For the pendulum example, a parameter is the length of pendulum. For the filter example, a parameter is the values of the filter taps.

Stateflow® is an example of a state-based dynamic system modeling application. Stateflow® is configured as a tool in Simulink® that can be used to design embedded systems that contain control, supervisory, or mode logic. By using Stateflow® with Simulink®, users can create models that combine state transition behavior (for example, fault detection or mode switching) with algorithmic continuous-time and discrete-time behavior (for example, feedback control or signal conditioning). Users can also create a model of the system and its environment in Simulink® and run hybrid executions to study the interactions between the two.

In Simulink®, a Stateflow® block uses a state diagram to represent an object with a discrete set of modes. These modes are known as states. A Stateflow® chart is a graphical representation of a finite state machine where states and transitions form the building blocks of the system. Stateflow® charts enable the graphical representation of hierarchical and parallel states and the event-driven transitions between them. The Stateflow® finite state machine reacts to events by changing states for the controlled object. A control object can be a motor, a pump, or any device that changes the behavior of the model to control its operation. The behavior of the object depends on what state the object is in and how the object changes from one state to another.

In the specific example application Stateflow®, the modeling process for modeling state-based executions, is embedded in Simulink®. Thus, the execution is invoked by Simulink® or some other time based dynamic modeling application, and does not run independently. In the case of Stateflow®, as execution starts, Simulink® starts its clock. When the execution engine reaches a Stateflow® block, the Simulink® clock stops ticking, and the execution engine passes information to Stateflow®, and awaits a signal back from Stateflow®. Stateflow® then performs its state-based modeling process. Once all the Stateflow® blocks finish their execution, outputs are sent to Simulink®, and the Simulink® clock starts ticking again. Therefore, during the execution of Stateflow® blocks, the execution is instantaneous, i.e., has no time effect on the Simulink® model. All the events and state transitions that occur in Stateflow® are considered to have taken place at the specific moment in time when the clock stops.

An example of a Stateflow® form of state diagram model is shown in FIG. 2. Each arrow in the Stateflow® diagram also has values like the Simulink® arrows, but these values represent a decision value relating information that can cause one state to transition to another. The arrows in Stateflow® also indicate the direction of the signals. The exemplar Stateflow® diagram as shown in FIG. 2 is embedded in a Simulink® environment as shown in FIG. 3. The Simulink® signals are provided to Stateflow®, and Stateflow® uses this information to decide whether there are changes in states.

More specifically, in operation, a state flowchart 136 diagram is shown in FIG. 2, which corresponds to a detailed description of the flowchart 136 shown in FIG. 3. In FIG. 3, port data temp 158 receives a signal from the output of physical plant 146. Port temp_min 156 receives a value from a constant block 144 in Simulink® as the minimum set point temperature for the physical plant. Data switch 136 receives data from Simulink® constant block 140 or 142 indicating whether the switch should be on or off. Output port speed 160 on the state flowchart is then calculated based on input values 154, 156, and 158. Physical plant 146 receives data from output port speed 160 for further calculations within the physical plant 146. Within the state flowchart 136 as shown in FIG. 2, there are two states: an on state 120 and an off state 122. The default transition 126 determines the initial state is the off state 122. When an on_switch transition 130 is enabled, the enable signal passes to junction 124 and determines whether the temp 158 data is greater or equal to 30, if not, then the enable signal is passed on to signal link 132 and further finish the transition to the on state 120. Now the on state 120 is active and off state 122 inactive. The off state 122 will become active again when the off switch signal 128 is enabled, at which time the on state 120 will be inactive.

One notable difference between Simulink® (and similar dynamic modeling programs) and Stateflow® (and similar state modeling programs) is that Stateflow® models in state changes of discrete events and is implemented within the time-driven environment, whereas Simulink® is modeled in continuous time or discrete time and is the time-driven environment. Said differently, Simulink® is a time-driven engine and Stateflow® is an event-driven engine embedded and initiated in a time-driven environment.

Dynamic systems are typically modeled in execution environments as sets of equations. At any given instant of time, the equations output values that can be considered states, and can also be communicated to state flow modelers. Thus, users conventionally have the ability to model using time-driven equations, and/or event-driven models controlled by time-driven equations. For example, if a user wants to know how fast a school bus is traveling at a specific moment in time, the user can use Simulink® to model the speed of the school bus. If part of the determination of the speed is what gear the school bus transmission is in, the gear indication can be modeled in Stateflow® within the Simulink® speed model.

Stateflow®, and similar state modeling applications, are therefore utilized where the location and exact behavior of objects are not important but actions taken or completed on or by the objects are of interest. Such state flowchart models are currently invoked by the time driven dynamic modeling environments, such as that of Simulink®. Hence, if only a small number of Stateflow® calls are made by Simulink®, delays can be practically non-noticeable.

However, returning to the school bus example, if the user wants to know in the event of an emergency how fast the school children can get off the school bus, then the user must attempt a highly complex combination of time-driven equations and embedded event-driven models in time-driven environments to approximate the movement of each child off the bus. In Simulink®, such a model will also track the exact position of each child, despite the fact that whether a child has progressed one centimeter forward is not the focus of such a model. Regardless, such information must be tracked in the time dependent graphical model. Also, in such a model, the clock time that each child leaves the bus is unimportant. However, the number of children getting off the bus, the intervals between each child getting off the bus, and the position of the child as either remaining on the bus or being safely off the bus, are what is desired to be modeled. Such events are highly complex to model in time-driven model executions and state-based model executions operating in time-driven environments.

Furthermore, if a user wants to model network traffic and to determine how fast a router can relay millions of packets, it is computationally costly to use the state flowchart model within the dynamic block diagram time driven environment because such a configurations require constant calls between programs. Hence, the delay in execution output can be very noticeable, and can even approach the hardware processing limitations and bog down a execution to the point of ineffectiveness.

Accordingly, a modeling application that is event driven, and does not require a continuous time operation to execute, is desired.

SUMMARY OF THE INVENTION

The present invention provides an event-driven discrete event system (DES) modeling environment for modeling the occurrence of events independent of continuous model time. In an event-driven DES modeling environment, state transitions depend not on time, but rather asynchronous discrete incidents known as events. The DES modeling environment enables creation of a model of an event-driven system and simulation, modeling and/or execution of the event-driven system by executing the model. A model of an event-driven system may comprise a block diagram comprising a number of interconnected blocks representing different components of the modeled system. The present invention allows a user to customize selected parameters of a block in an event-driven DES modeling environment. For example, a user can enable and disable ports a discrete event execution block in an event-driven discrete event execution model using a graphical user interface, such as a dialog box. Based on user-selected dialog inputs, a discrete event execution program can automatically update a specification for a block, for example, by adding ports to the graphical representation of the block.

According to one aspect of the invention, a method in a graphical discrete event execution environment is provided, including the steps of providing an event-driven discrete event execution graphical model having a first component able to support at least one entity passing therethrough holding a value of arbitrary data type and receiving a specification for a subset of ports of the first component of the event-driven discrete event execution graphical model prior to run-time. The method further comprises automatically updating a graphical representation of the subset of ports of the first component of the event-driven discrete event execution graphical model in response to said specification. A medium holding computer-executable instructions for executing this method is also provided.

According to another aspect of the invention, a method in a graphical discrete event execution environment is provided, which includes the steps of displaying a user interface for prompting a user to provide a specification for a subset of ports of an event-driven discrete event execution block prior to run-time, wherein the event-driven discrete event execution block is able to support at least one entity passing therethrough holding a value of arbitrary data type and automatically updating a graphical representation of the subset of ports of the event-driven discrete event execution block in response to said specification. A medium holding computer-executable instructions for executing this method is also provided.

According to another aspect of the invention, a method of building a graphical model in a graphical discrete event execution environment is provided. The method includes the steps of selecting an event-driven discrete event execution block from a library, wherein the event-driven discrete event execution block is able to support at least one entity passing therethrough holding a value of arbitrary data type and providing a specification for a subset of ports for the block in a graphical user interface associated with the event-driven discrete event execution block. A medium holding computer-executable instructions for executing this method is also provided.

According to still another aspect of the invention, a system for generating and displaying a modeling application for modeling an event-driven system is provided. The system includes user-operable input means for inputting data to the application, a display device for displaying a graphical model representing the event-driven system and an electronic device. The electronic device includes memory for storing computer program instructions and data, and a processor for executing the stored computer program instructions, the computer program instructions including instructions for displaying a dialog box allowing a user to specify a subset of ports on a block in the graphical model.

BRIEF DESCRIPTION OF THE FIGURES

An illustrative embodiment of the present invention will be described below relative to the following drawings:

FIG. 8 is an illustrative embodiment of a Discrete Event System model environment;

FIG. 9 is an illustrative representation of the Event calendar for use with the present invention;

FIG. 10 is an illustrative embodiment of the event calendar and system model of the present invention;

FIG. 11 is an illustrative embodiment of a Discrete Event System model environment;

FIG. 12 is an illustrative embodiment of the event calendar and system model of the present invention;

FIG. 13 is an illustrative embodiment of a Discrete Event System model environment;

FIG. 19 is an illustrative embodiment of the event calendar of the present invention;

FIG. 20A is an illustrative embodiment of the event calendar of the present invention;

FIG. 20B is an illustrative embodiment of the event calendar containing priority data for use with the present invention;

FIG. 31 is a flowchart illustrating the steps involved in specifying a component in an event-driven discrete event execution graphical model according an embodiment of the invention;

FIG. 32 is a flowchart illustrating the steps involved in building a graphical model in an event-driven discrete event discrete event execution environment according to an illustrative embodiment of the invention.

DETAILED DESCRIPTION

It is therefore desired to provide a modeling environment that can model the occurrence of events independent of continuous model time. A graphical discrete event execution environment, such as an event-driven discrete event system (DES) modeling environment is one wherein the system's state transitions depend on asynchronous discrete incidents called events. Such an execution differs greatly from a time-based execution, such as Simulink®, wherein the execution is time dependent.

Figure 1:
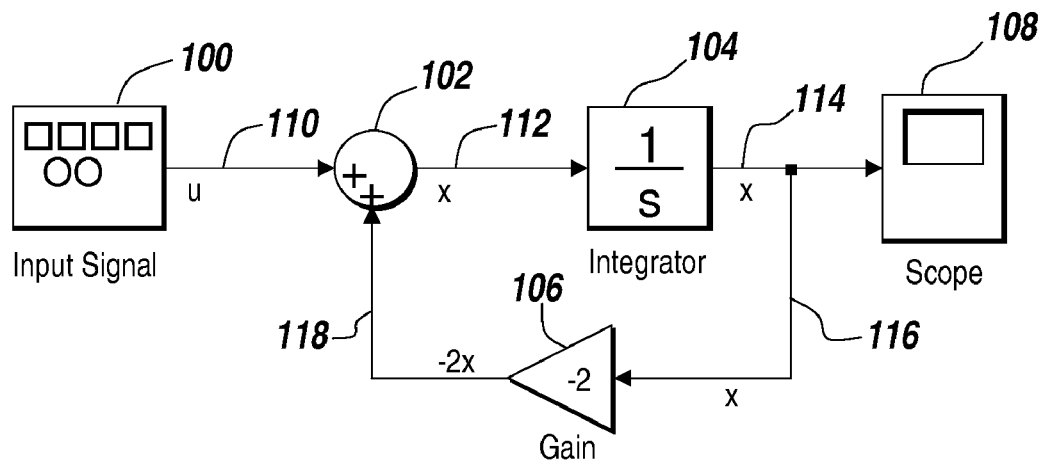
FIG. 1 is an illustrative embodiment of a Simulink® model for use with the present invention.
Figure 2:
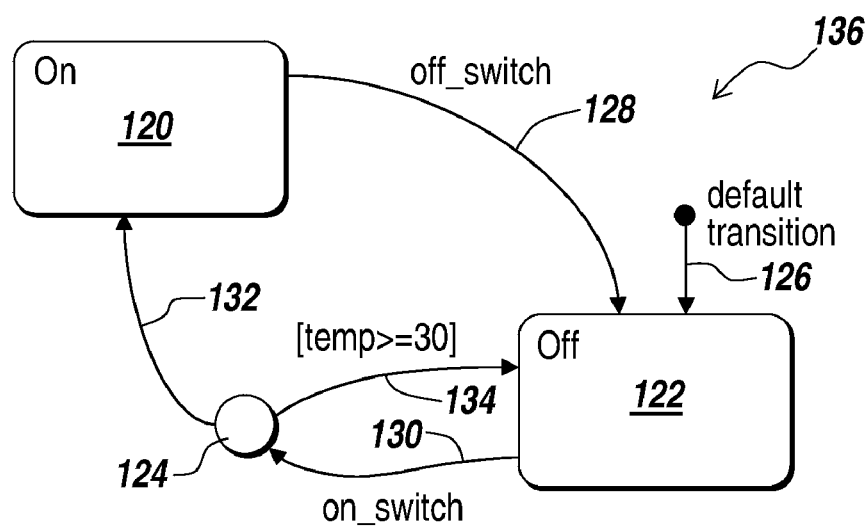
FIG. 2 is an illustrative embodiment of a StateFlow® model for use with the present invention.
Figure 3:
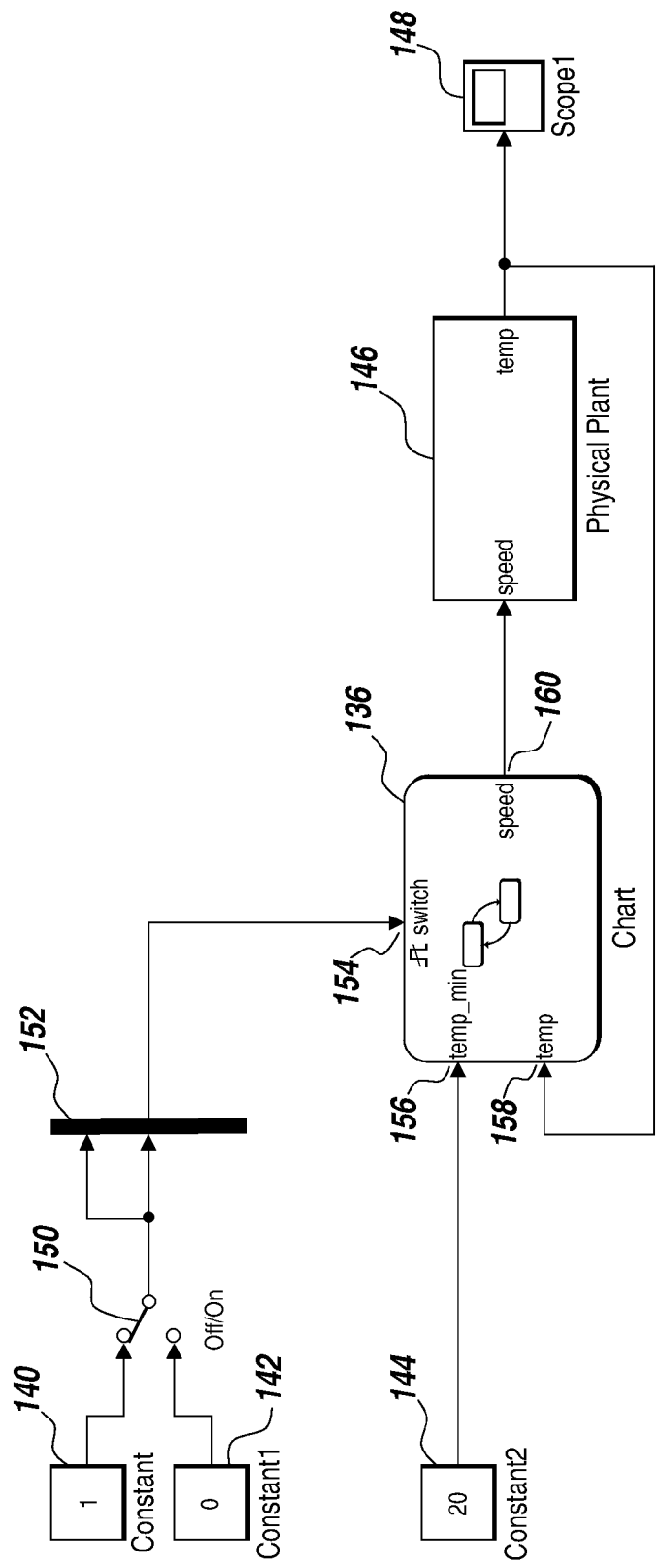
FIG. 3 is a hybrid external environment for use with the present invention.
Figure 4:
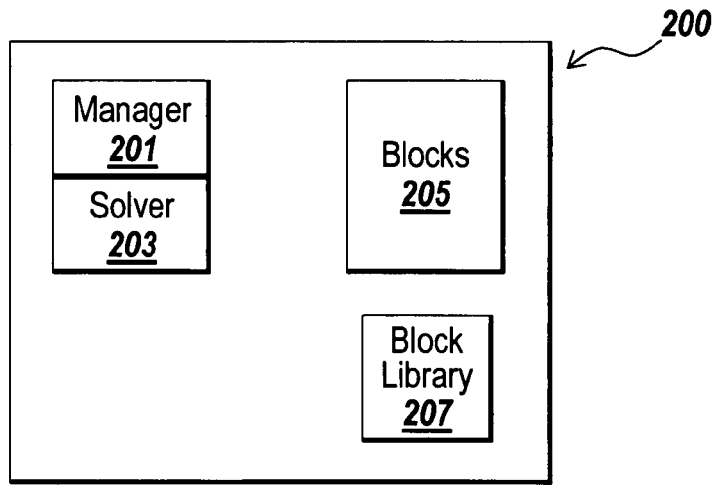
FIG. 4 is an illustrative example of a Discrete Event System model environment for use with the present invention.

In reference to FIG. 4, an embodiment of a graphical discrete event execution environment, illustrated as an event-driven DES model environment 200 is provided for modeling an event-driven system. The DES model environment 200 includes an event modeling manager 201. The manager 201 coordinates the operation of the DES model environment to create and process model executions. The manager 201 includes a solver 203, which processes a DES model of an event-driven system configured in the DES model environment 200. The manager 201 provides for the implementation of the DES model environment 200 by supporting the creation of DES blocks 205 that represent various aspects of the DES model. The blocks 205 can represent different portions of the model as later described herein. Example blocks include an entity generator, a queue, a server, and a terminator, in addition to other blocks having specific tasks and implementations. A block library 207 can be provided that is customized for operation within the DES environment. Furthermore, the block library in the present DES modeler is not industry specific, thereby providing for numerous user defined applications.

A primary data component within the DES model is referred to as an entity. Entities are abstract representations of areas of interest within the DES model and may vary depending upon that which is being modeled by the DES system. Entities are the items that pass from block to block in the DES modeling environment. For example, when modeling a digital network, an entity may represent a data packet. In another example, when modeling a manufacturing plant, entities may take the form of individual items on the assembly line. Each DES model has at least one entity within the model.

The blocks 205 are interconnected using block connectors that pass entities and other information between blocks. The information can include information from other models or data sources or references that have some contribution to the creation or operation of the entities as they pass through the DES model. The blocks can also have block connectors that pass information out to other models or data sources outside of the DES model.

In operation, the DES model environment 200 makes use of the various blocks to organize and manipulate entities through the DES model. For example, the manager 201 manages the configuration of multiple blocks 205 to form the DES model. Blocks 205 can be placed in the model for entity generation, subsequent entity manipulation, and eventually entity termination. The basic operation of the DES model involves passing the entities through the blocks according to instructions governed by the manager 201 and solver 203. The manager 201 can be represented by an event calendar, wherein the event calendar serves to drive the DES model forward by executing the next scheduled event in the event calendar. The solver 203 in the present invention is a DES specific mechanism, which allows for the execution of events in the DES event calendar in light of operations that can occur in the external environment. The solver 203 of the present invention, therefore, is in communication with the external environment and can notify the external environment of events within the DES environment, which can affect the semantics of the external environment.

Nominally, an entity contains a set of attributes associated with the entity. However, an entity can contain as few as zero attributes. An attribute can be a field wherein the attribute is named and the attribute type is defined. For example, a field can define the entity type as a Boolean, a real number, an integer number, an enumerated type, a string, a vector, a matrix, a frame, and the like, such that the entity is of arbitrary data type. An arbitrary data type represents an arbitrarily complex structure containing data that may include hierarchical composition. The contained data can be as general as a single bit of information and any sequence of such bits representing characters, numeric values, or any other syntactic and semantic datum. Furthermore, an entity can contain subentities. Sub entities can be utilized in numerous operations such as recursive nesting or combining hierarchies.

The generation of entities can be automatic, or can be user-defined. User-defined entities allow users within a specific industry to define those attributes that are specific to their needs. The entity can then be incorporated into a DES model, thereby providing great user flexibility. Entities can further incorporate randomness into their behavior via probability distributions associated with blocks generating each entity. These probability distributions can be representative of the probability of an entity being generated based upon a set of defined variables. Probability distribution can be user defined or can be generated automatically, such that a probability of an event occurring drives entity generation within the model. Furthermore, the generation of a probability distribution may be accomplished utilizing other applications or environments, such as but not limited to the MATLAB® environment or the Simulink® environment.

It should further be noted that there can be a relationship between attributes and random numbers as well. When setting attributes of entities, the user can assign values based on input from separate environments, such as Simulink®, to attributes in passing entities. Such separate environments can allow the values to be drawn from a probability distribution. The separate environment thus allows the attributes to be assigned samples from random variables. These random values can be used to introduce randomness in a controlled way to other parts of the model when they move into those parts of the model.

Figure 5:
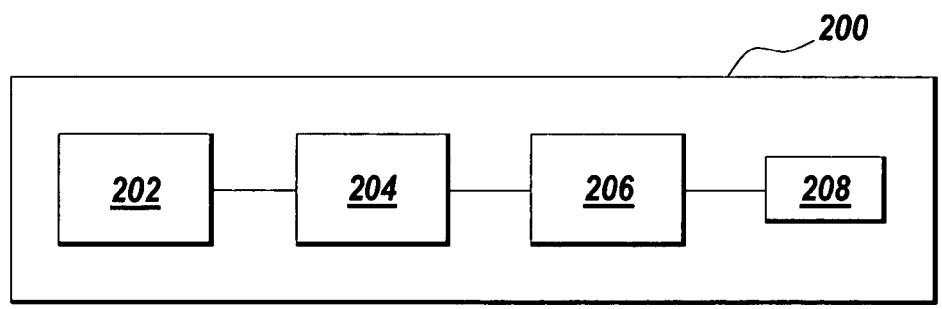
FIG. 5 is an illustrative embodiment of a Discrete Event System model environment.

FIG. 5 depicts a sample DES model environment 200. The present DES model environment includes sources 202 and sinks 208 as depicted in FIG. 5. Sources 202 correspond to those blocks that allow data input into the model, while sinks 208 correspond to those blocks that remove entities from the model. A source 202 in a DES model can take numerous forms. A source 202 can be an entity generator that produces numerous entities at fixed time intervals. Another example of a source 202 is an external operating environment outside of the DES model. For clarity, this external operating environment is not shown on FIG. 5. However, as an example, Simulink® can be used as a source for the present DES modeler, wherein a Simulink signal can trigger the generation of an entity for use in the DES model based upon criteria set by a DES modeler user.

Sinks 208 in a DES model can have functions other than terminating entities, such as returning arbitrary values from entities. A DES sink 208 can display all of the attributes passed to it, or can display a defined set of variables. Sinks 208 for use in the DES modeler of the present invention can also take various forms. One example of a DES modeler sink 208 is a Terminator Block. The Terminator Block can be defined to accept all entities delivered to it, or in the alternative can block all or some entities delivered to it according to selected conditions. Another example of a possible form of sink 208 in the present DES modeler is a Scope Block. The Scope Block can accept an entity and plots data from the entity in a graphical manner. This graphical depiction can allow a user to closely monitor the status of the DES model as well as view numerous trends within the model graphically. A Display Block can also display selected attributes of an entity. Furthermore, a sink 208 in the present invention can be a block that allows the export of a signal from the DES model to an external environment. For example, the DES modeler of the present invention can include a block that receives an entity and outputs a Simulink® signal that may be used in a Simulink® environment.

In the present invention, entities generally pass from sources 202 to sinks 208. Entities can, however, traverse numerous intermediate blocks 204, 206 on the pathway from source 202 to sink 208. These intermediate blocks 204, 206 can be represented by numerous specialized DES blocks within the block library of the present DES modeler.

These intermediate blocks can have the same functionality as described above for the sinks. For example, the intermediate blocks can display all of the attributes passed to them, or can display a defined set of variables. The intermediate blocks can have conditions to define which entities can pass through them. Scope Blocks can serve as intermediate blocks that accept an entity and plot data from the entity in a graphical manner. Display Blocks can also display selected attributes of an entity. Furthermore, the intermediate blocks can include blocks that export a signal from the DES model to an external environment, or import a signal or other input information from an external environment.

Figure 6:
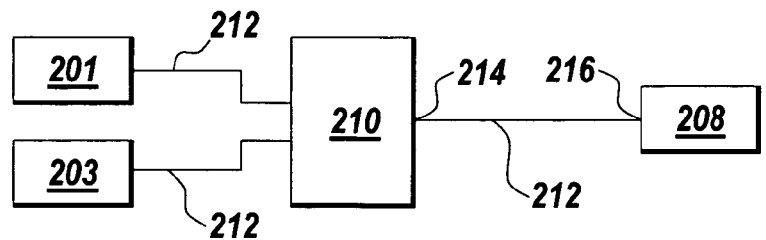
FIG. 6 is an illustrative embodiment of a Discrete Event System model environment.

FIG. 6 depicts an example of an intermediate block utilized in accordance with one embodiment of the present invention. A Routing Block 210 may be placed between a two source blocks 201, 203 such that only a subset of entities is passed to a sink block 208. The subset is determined by the logic of the Routing Block and the data that it uses to determine the path from which the entity is allowed to arrive. Additional intermediate blocks that can be used in accordance with the present invention include, but are not limited to Logical Gates, Queuing Blocks, Storage Blocks, Routing Blocks, Execution Control Blocks, Server Blocks, Resource Allocation Blocks, Timer Blocks, Timeout Blocks, and Delay Blocks. Additionally, the DES environment allows for users to customize and define their own blocks specific to the problem they are modeling and the model they have developed.

The path that an entity takes through the DES modeler environment, as depicted in FIG. 6, is an entity path 212. The entity path 212 is any connection from an entity input port 214 to an entity output port 216 on a block within the DES modeler. For illustrative purposes, these entity paths are represented by a line connecting the entity input 214 and output ports 216 of blocks within the DES model environment. The entity path 212 in the DES model environment is active only when an entity is passing through the entity path 212. At times when there is no entity passing through the entity path 212 in the execution, the entity path has no value associated with it.

Further, there may be associated with each block in a DES environment a state, wherein the state is a persistent data set corresponding to the block. The state variable of a block contains a set of attributes associated with the block (i.e. a Boolean operation, string, parseable string array) and may contain a sub state variable for nesting and combining hierarchies.

Within the DES model of the present invention, there can be numerous events. Events are instantaneous occurrences that change a state variable, an output, a future event or any combination thereof. Events are generated at any point at which a block within the DES model acts on an entity. Events can take numerous forms, but by example can include the creation of a new data packet in a network, the exit of a package from loading dock or the placement of an item on a conveyor belt in a manufacturing plant. Each event within a DES model contains four specific characteristics associated with the event. Firstly, each event specifies an entity, namely a set of data associated with the event. Additionally, each event has time data associated with it, defining when the event is scheduled to occur. Events in a DES model can also have a priority associated with their execution, thereby defining the urgency of the event relative to other events that may occur at the same time. Finally, each event has a destination object associated with it, which serves to identify where the event is to take place. The destination object is typically a DES model block but can also be an entity.

Figure 7:
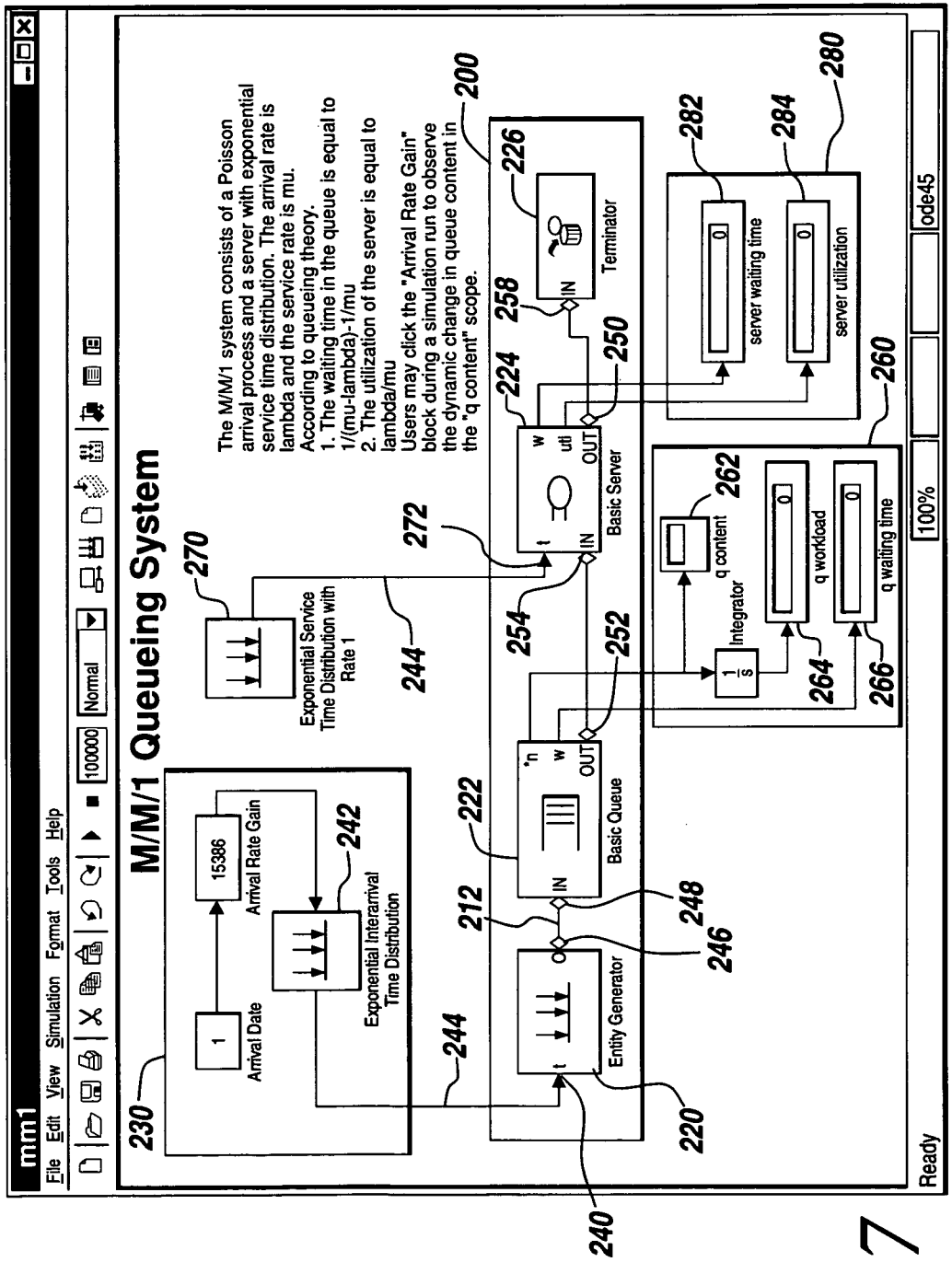
FIG. 7 is an illustrative embodiment of a Discrete Event System model environment in communication with an external environment.

In FIG. 7, a DES environment 200 is denoted. The DES model is capable of communicating with external environments of various forms 230, 260, 270, 280 including such examples application as Simulink® and Stateflow®. The DES model can receive data from these environments 230 and 270 as well as output data to these external environments 260, 280 in accordance with the needs of the user generating the model. Communication with the external environments 230, 270, 260, 280, however, is not necessary, as execution models may be created solely within DES environment that have no interface with environments beyond the DES environment 200.

An entity generator within the DES environment 220 can interface with an external environment 230, such as Simulink®, at port "t" 240 on the entity generator 220. The entity generator block 220 is an example of a source block within DES. The signal transmitted on signal path 244 and received at port "t" 240 is used to control the rate of entity generation by the entity generator 220. Associated with the signal on signal path 244 is a probability distribution provided by the Exponential Interarrival Time Distribution (Simulink®) subsystem 242 within the external environment 230. In light of this probability distribution, a varying signal is presented to the entity generator 220 resulting in the generation of entities in accordance with the probability distribution of the Exponential Interarrival Time Distribution (Simulink®) subsystem 242. Entities generated by the entity generator 220 are passed from the output port of the entity generator 246 to the input port of the queue block 248 over the entity path 212.

The queue block 222 accepts entities and is capable of forwarding them to further associated blocks. In the present example, the entities generated by the entity generator 220 can be forwarded to the server block 224 by the queue block 222 in accordance with user defined values. For example, a user may instruct the queue to hold no more than 10 entities for forwarding. When the queue block 222 has reached capacity, the input port to the queue block 248 may be temporarily disabled, thereby preventing the introduction of any more entities to the queue block 222. In such a scenario, the input port of the Queue Block 248 is defined as unavailable. When the number of entities within the queue block 222 has decreased below the 10 entity limit, the input port to the queue block 248 can be made available, allowing the delivery of additional entities from the entity generator 220 to the queue block 222. Entities within the queue block 222 can be queued based upon the time at which they were generated by the entity generator 220, or can be queued based upon numerous other arrangements. For example, a priority may be associated with various entities, and the queue block 222 may queue entities based upon their priority. Furthermore, as exhibited in FIG. 7, the queue block 222 may interface with an external environment 260 outside of the DES model 200. As illustrated, the queue block 222 has been associated with a scope 262, a first display 264 and a second display 266, thereby allowing a user to graphically view that which is occurring within the queue block 222.

The queue block 222 of the illustrative embodiment can pass entities from the output port of the queue block 252 to an input port 254 of the associated server block 224. The server block 224 can accept entities delivered through the entity path 212 connecting the queue block output 252 to the Server Block input port 254. The Server Block 224 can delay a received entity for a selected amount of time before passing the entity to the next associated block, namely the Terminator Block 226. The delay associated with a server is known as a "service time". Service time may be user-defined, or may be based upon an internally or externally generated value. For example, the example embodiment utilizes a Simulink® signal with an associated probability distribution in the Exponential Service Time Distribution with Rate 1 block 270. This results in a variable service time for the server block 224. This variable service time is provided to the Server Block 224 at port 272 of the server block via a signal line 244. While the server block 224 is busy, i.e. during the service time, the server block 224 will make its input port 254 unavailable, thereby preventing the reception of any additional entities. Upon expiration of the service time, the input port to the server block 254 will be made available, thereby allowing the passage of entities once again. Simultaneously, once the service time is completed, the server can pass entities from an output port of the server block 250 to a further associated block. In the present example, this block is a terminator block 226, which is a sink within the DES environment. The terminator block 226 can be user-defined to accept all entities passed to it, or may have other functionality defined by a user. For example, the terminator block 226 may be defined such that it blocks all entities delivered to it, or may produce an error message upon the arriving of an entity. The server block 224 of the illustrated embodiment can further be associated with an external environment 280 external to the DES model. As evidence in the example, the server block 224 can deliver a signal to a first graphical interface 282 and a second graphical interface 284 so that a user can monitor the internal operations of the Server block 224.

In a DES model environment, the DES solver is driven by ordered events, therefore time becomes a secondary variable in the execution. The order of events within a DES model is continually updated in response to changes in the model. Utilizing such an event-driven model, only those points at which an event is scheduled to occur need to be modeled. Time between events, namely "empty time" need not be modeled, thereby resulting in improved efficiency and decreased processor demand.

Events within a DES model are scheduled and managed using an Event Calendar. Unlike a time-based modeling environment, size of the time interval between events is simply the period of time between events. Using the Event Calendar, the DES model can determine when to update the states of certain block in the model, and can also infer when to save time by not updating states. An example of the application of the Event Calendar is best seen by example.

FIG. 8 is an example DES model for use in describing the Event calendar. In the illustrative example, the blocks, for purposes of illustration, are configured so that the Entity Generator 300 block generates an entity at various times, namely t=0.9 seconds, 1.7 seconds, 3.8 seconds, 3.9 seconds, 6 seconds. The illustrative queue block 302 has a capacity of 20. Additionally, the illustrative server block 304 uses random service times that are uniformly distributed between 0.5 seconds and 2.5 seconds. When the execution first starts, the queue block 302 and server block 304 are empty. The entity generator block schedules a first event at t=0.9 s. An illustrative example of the event calendar 900 at time t=0.9 is illustrated in FIG. 9. One skilled in the art will recognize that the described parameters are merely illustrative of one example, and that the model can generate any suitable number of entities at any suitable time, the queue block can have any suitable capacity and the server block can have any suitable service time.

At t=0.9 seconds, the entity generator block 300 of FIG. 8 creates an entity and attempts to output the entity from the entity generator output 346. Because the queue block 302 is empty, the entity advances from the entity generator block output 346 to the queue block input 348 over the entity path 212 in the model. Since the queue block 302 only has no entity within it, the queue block 302 attempts to output the entity to the next block in the model, namely the server block 304. Because the server block 304 is empty, the entity advances from the queue block 302 to the server block 304. At this moment, the server's entity input port 354 is temporarily unavailable to future entities.

Upon receiving the entity, the server block 304 schedules an event that indicates when the entity's service time is completed. For the purpose of illustration, duration of service of 1.3 seconds is assumed. In light of this, service will be completed at a time of t=2.2 seconds, which is the sum of the time that the entity enters the server, and the service time.

As set forth previously, a second entity generation event is scheduled at t=1.7 seconds. The event calendar and the associated DES model 903 at a time of t=1.7 seconds is depicted in FIG. 10. The updated Event Calendar 902 is shown, as well as a graphical representation of entity status within the DES model. In FIG. 10, the element marked "e1" 404 signifies the first entity and the dashed arrow 906 serves to indicate the advancement of the first entity 404 from the entity generator block 300 to the queue block 302 and finally to the server block 304.

As evidenced in the Event Calendar at time t=1.7 seconds 902 of FIG. 10, a second entity is to be generated at a time of t=1.7 seconds.

FIG. 11 is an illustrative embodiment of the present invention at a time of t=1.7 seconds 904. At a time of t=1.7 seconds the entity generator block 300 will create an entity "e2" 504 and will attempt to output it. The queue block 302 is empty at this point in time, so the second entity 504 advances from the entity generator 300 to the queue 302 as illustrated in FIG. 11. The advance of the second entity 504 is depicted by the dashed arrow 506.

As depicted in FIG. 11, the newly generated entity "e2" 504 is the only one in the queue block 302. The queue block 302 will therefore attempt to output the second entity 504 to the server block 304. As entity e1 404 remains in the server block 304, the server block's input port 354 is unavailable to receive the second entity 504. The second entity 504 will therefore remain in the queue block 302 until the server becomes available.

FIG. 12 is an illustrative example of the event calendar at a time of t=3.8 seconds 905. Based upon the original assumptions, the entity generator block will schedule the generation of a third entity (e3) at a time of t=3.8 seconds.

FIG. 13 is an illustrative embodiment of the present invention at a time of t=2.2 seconds 906. At t=2.2 seconds, the server block 304 finishes serving the first entity 404 (i.e. service time is completed) and attempts to output the first entity 404 to the associated terminator block 306. The terminator block 306 is simply a sink that by definition accepts and absorbs all entities. In light of this, the first entity 404 advances from the server block 304 output port 356 to the terminator block 306 input port 358. As the first entity (e1) 404 advances, the server block's 304 entity input port 354 becomes available once again, allowing the queue block 302 to pass the second entity (e2) 504 to the server block 304 via the server block input port 354 via an entity path 212. Upon passing the second entity 504 to the server block 304, the queue block 302 is now empty and the server block 304 becomes busy again. As the server block 304 is busy, the server block's entity input port 354 becomes temporarily unavailable once again.

Figures 14, 15, 16:
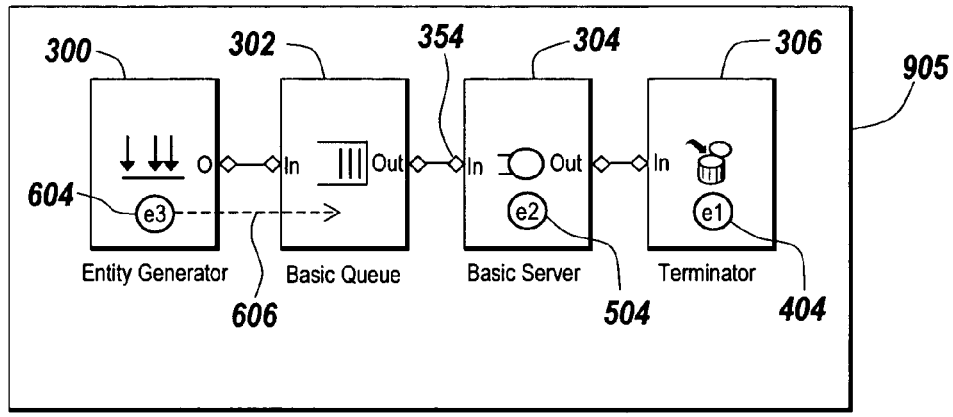
FIG. 14 is an illustrative embodiment of the event calendar and system model of the present invention.
FIG. 15 is an illustrative embodiment of a Discrete Event System model environment.
FIG. 16 is an illustrative embodiment of the event calendar and system model of the present invention.

FIG. 14 is a depiction of the Event Calendar at a service time of t=4.2 seconds 904. The event calendar at time t=4.2 seconds has been generated using the assumption that a service time of t=2.0 seconds has been established for the second entity.

FIG. 15 is a graphical depiction of the DES model at a time of t=3.8 second 905. At t=3.8 seconds, a third entity 604 will be generated by the entity generator block 300. The queue block 302 remains empty, so the third entity 604 advances from the entity generator 300 to the queue block 302. The advancement of the third entity 604 from the entity generator 300 to the queue block 302 is illustrated by the dashed line 606.

Because the third entity 604 is the only one in the queue block 302, the queue block 302 will attempt to output the entity to the server block 304. As set forth above, the server block's input port 354 remains unavailable due to the presence of the second entity 504 in the server block 304, so the third entity 604 will remain in the queue block 302. The queue block's 302 entity output port 352 is said to be blocked because an entity has tried and failed to depart via this port.

FIG. 16 graphically represents the event calendar and the system model at a time of t=3.9 seconds 906.

Figure 17:
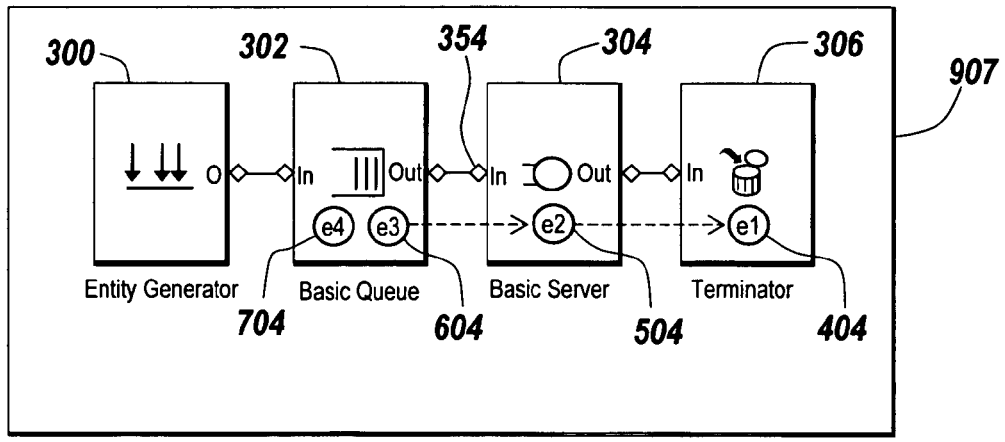
FIG. 17 is an illustrative embodiment of a Discrete Event System model environment.

FIG. 17 is a graphical depiction of the present invention at a time of t=3.9 seconds 907. At t=3.9 seconds, the entity generator 300 schedules the generation of a fourth entity 704. The entity generator 300 will attempt to output the fourth entity 704 to the queue block 302. Since the queue block 302 is not full, the fourth entity 704 will advance from the entity generator block 300 to the queue block 302. The server block's entity input port 354 remains unavailable, therefore the queue block 302 cannot output the fourth entity 704 to the server block 304. The queue length within the Queue Block 302 is two, as depicted in FIG. 17.

Figure 18:
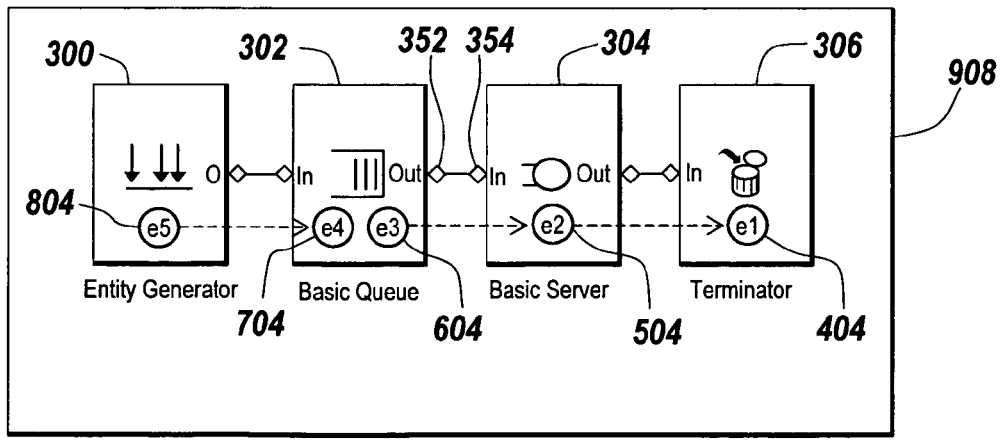
FIG. 18 is an illustrative embodiment of the event calendar and system model of the present invention.

FIG. 18 is a graphical depiction of the DES model and event calendar at a time of t=6.0 seconds. At t=6.0 seconds, a fifth entity 804 is generated by the entity generator 300. At time t=4.2 the server block 304 finishes serving the second entity 504 and attempts to output the second entity 504 to the terminator block 306. The terminator block 306 accepts the second entity 504 and the second entity 504 advances from the server block 304 to the terminator block 306 via a entity path 212. Additionally, the server block's entity input port 354 becomes available, so the queue block's entity output port 352 becomes unblocked. The queue block 302 is now able to output the third entity 604 to the server block 304. The queue length within the queue block 302 has decreased to only one entity, namely the fourth entity 604, and the server block 304 once again becomes busy. When the server block 304 is busy, the server block's entity input port 354 again becomes temporarily unavailable. The server block 304 will schedules an event on the event calendar that indicates when the entity's service time is completed on the event calendar. For illustrative purposes, 0.7 seconds will be used. The event calendar at a time of t=6 seconds 909 is presented in FIG. 19.

The queue block 302 will attempt to output the fourth entity 704, but the server block's entity input port 354 is unavailable. In light of this, the fourth entity 704 remains in the queue block 302. At the same instant, the queue block's entity output port 352 becomes blocked, prohibiting further attempt to pass the fourth entity 704 to the server block 304 while the server block's input port 354 remains blocked.

Remaining entities within the illustrated model will pass through the model in accordance with the above steps as driven by the event calendar. Additional entities may be placed on the calendar by the entity generator block 300, or no additional entities may be generated and the execution will be complete upon the passage of the fifth entity 804 to the terminator block.

The defined times on the event calendar are inherently important within the DES modeling systems, as events on the event calendar serve as indicators of times at which the systems state is changing. In contrast, times between events on the event calendar are not important to modeling the system, in that at these times the system state remains unchanged. In light of this, the DES modeler skips the static periods and focus on the event times of the event calendar. Such an arrangement offers increased efficiency as compared to a fixed sampling interval.

Additionally, at defined times within the event calendar, multiple states can change instantaneously. For example, at time t=2.2, the server block 304 becomes idle and then busy again. Simultaneously, the queue length also changes because the queue block 302 outputs a first entity 404 to the server block 304.

The illustrative event calendar serves as a convenient example of event processing at discrete time periods within the model. Inherent in advanced modeling of a system, however, is an occurrence of two or more events that are scheduled to occur at the same time instant. Such events are defined as "simultaneous" events and are depicted on a sample event calendar in FIG. 20A. The sequential processing of these simultaneous events may be irrelevant or relevant to the execution results, therefore the DES modeler contains numerous methods for determining the proper processing sequence. One such method is the assignment of priority levels to the events.

In FIG. 20B, priority values 830, 832 are assigned to the simultaneous events 820, 822 within the event calendar. The relative priorities among the simultaneous events therefore determine their processing sequence within the event calendar. Using a priority value associated with simultaneous events allows a user to decide how various events are related to each other. However, this approach might be inappropriate if a deterministic approach produces a bias that inaccurately reflects the phenomena that a user is modeling. In light of such concerns, a random sequence may be utilized. The random sequence for executing simultaneous events offers the advantage of eliminating bias in the execution, but results in the non-repeatability of the execution should a user run the execution more than once, assuming random number seeds are not utilized.

The DES model of the present invention allows for the transfer of information to various block within the DES model environment, as well as to environments outside of the DES model. For example, as indicated in FIG. 7, the use of a terminator block as a sink may allow for acceptance of all entities within the model. In place of or in conjunction with the terminator block, a scope block may be utilized to accept an entity and plot data from an attribute of the entity. Data plotted may include a plot of information related to entities experiencing a discrete event or a discrete state. Utilizing a scope block a user can visually verify the operation and performance of a DES model. Additionally, a display block may be associated with the DES model such that the value of an attribute of an entity is graphically displayed. The DES model of the present invention further includes blocks that allow the export of entity attribute values to regions outside of the DES model environment. For example, individual entity priority data may be exported to an external modeling environment such as Simulink®. Control of export of data from this block can take place within the DES model environment, can be controlled by an external environment, or can be a combination of both. In light of this, when modeling complex systems, the DES model of the present invention can be incorporated into other modeling and display applications. In the alternative, the DES model of the present invention can operate in a stand alone configuration, wherein a system to be modeled is modeled solely within the DES model environment.

In order to model events using the DES modeling environment, described above, a user first creates a graphical model, such as a DES block diagram, of the system to be modeled. A DES graphical model preferably includes at least one component able to support at least one entity passing therethrough holding a value of arbitrary data type. A graphical model may be created prior to run-time, i.e., prior to execution of the model, using a graphical user interface, such as a graphical model editor. After creation of the graphical DES model, the behavior of the system is executed using the information entered into the graphical model.

The components of the illustrative DES manager 201 for coordinating the operation of the DES model environment to process model executions may include a block diagram editor for graphically specifying models. The block diagram editor allows users to perform such actions as construct, edit, display, annotate, save, and print out a graphical model, such as a block diagram, that visually and pictorially represents an event-driven system. The illustrative DES modeling application also includes graphical entities, such as blocks and connection lines that represent paths between the blocks. In a discrete event-driven execution system, each block represents a processing station for modeling a process on an entity, such as servicing an entity for a selected period of time, delaying an entity, queuing an entity, switching the path of an entity and so on.

The block diagram editor is a graphical user interface (GUI) component that allows a user to create and modify a block diagram model. A suite of GUI tools within the block diagram editor allows users to draft a block diagram model on the corresponding windows. For example, in the DES model environment 200, the GUI tools include a block palette, a connection tool, an annotation tool, a formatting tool, an attribute editing tool, a save/load tool and a publishing tool. The block palette is a library of all the pre-defined blocks available to the user for building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

A block diagram may be constructed by means of a computerized graphical user Windows® interface in which the various required graphical objects (blocks, connection lines, etc) are picked from pull-down lists or pop-up palettes and dragged into position on the computer screen. Default values for the various required alphanumeric labels may be automatically generated and displayed for possible subsequent editing by the user. Furthermore, templates for many commonly used generic functions and function blocks are available for copying from a shared library.

Figure 21:
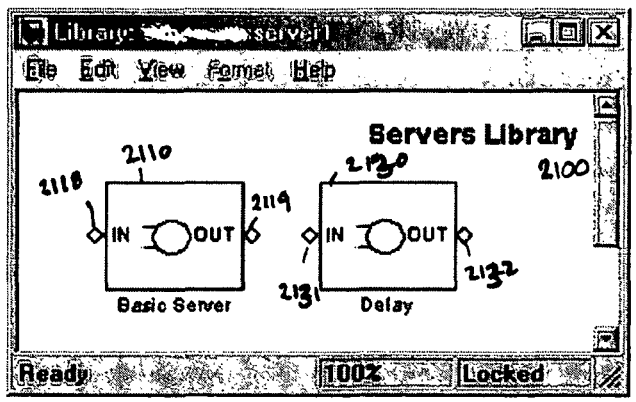
FIG. 21 illustrates a portion of a block library in a DES modeling environment for storing server blocks in an initial state.

According to an illustrative embodiment of the invention, a block library initially stores event-driven blocks for modeling a system in an initial state, having a minimal or nominal number of ports. Each port on a block represents an interface for passing entities or signals into or out of the block via a connection line. For example, FIG. 21 illustrates a graphical representation of an illustrative block library 2100 for an event-driven environment, including a server block 2110 and a delay block 2130. The illustrative initial server block 2110 includes an input port 2118 for passing entities into the server block for servicing by the server block and an output port 2119 for outputting entities from the server. Generally, the server block only services one entity for a selected period of time, then attempts to output the entity via the output port 2119. If the output port 2119 is blocked, the server block 2110 retains the entity for as long as the output port is blocked. While the server services an entity, the input port 2118 may be blocked to prevent other entities from being passed into the server block. In the initial state within the library, the illustrative delay block 2130 also includes a single input port 2131 and a single output port 2132. One skilled in the art will recognize that the blocks may have any suitable configuration in the initial state.

In an illustrative embodiment of the invention, means are provided for allowing a user to customize a DES block selected from a library according to user-defined specifications. In one embodiment, the user can customize a block using a graphical user interface, such as a dialog box, to define parameters of the block, such as the number of ports on the block. The user can add or subtract ports and/or modify a selected port on the block using the dialog box. For example, the user can provide a specification for a subset of the ports on a block, where the subset comprises a set of ports that includes some, but not all, of the ports on a block.

The present invention further allows for customization of a block's ports for multiple domains. A port on a block can be an interface between two blocks in an event-driven environment and therefore be configured to pass and receive entities. Alternatively, the port can be a signal port configured to pass time-driven signals to or from an event-driven block. For example, the port can be an interface between an event-driven domain, such as the DES model environment and a time-driven domain, such as Simulink®. The port can alternatively be an interface between an event-driven domain and a state-driven domain, such as Stateflow®. In another embodiment, the port can provide an interface between an event driven domain and a dataflow-driven domain, which models dataflow over time.

Figure 22:
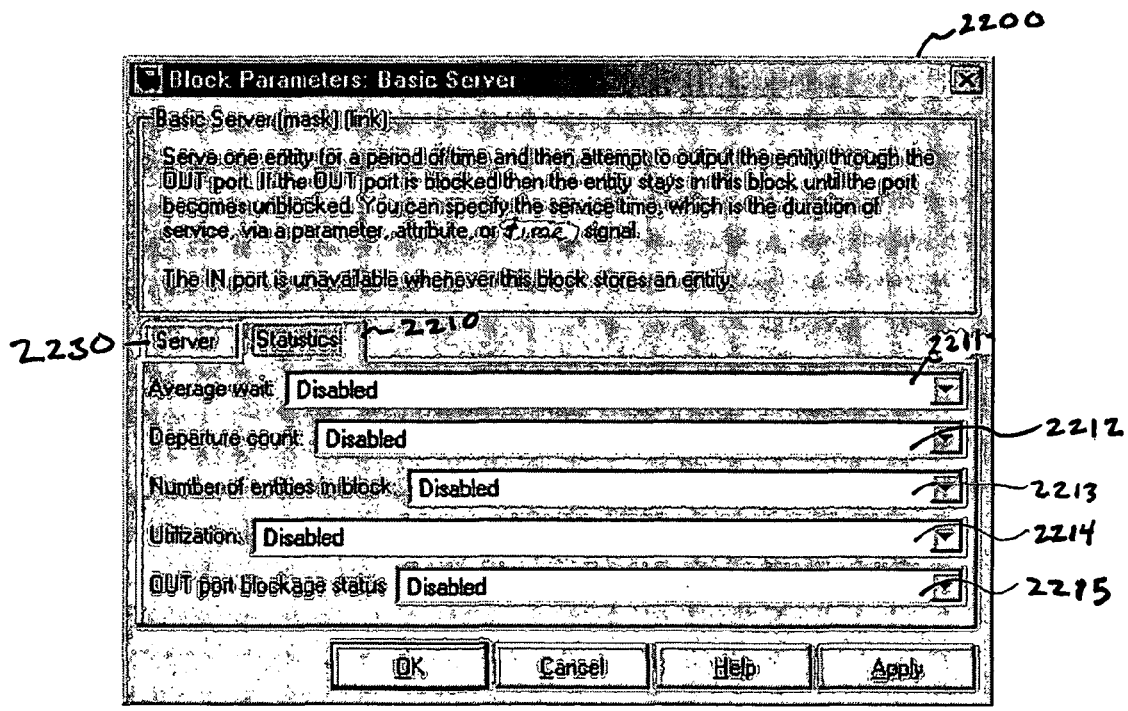
FIG. 22 illustrates a dialog box for receiving user-defined parameters for a basic server block in a DES modeling environment according to an illustrative embodiment of the invention.

A graphical user interface, such as a dialog box, enables a user to define, specify, edit and/or customize parameters and settings of a graphical object or component of a block diagram prior to run-time. FIG. 22 shows an example of a block properties dialog box 2200 for the basic server block 2110 of FIG. 21, which allows a user to specify properties and parameters of a selected server block associated with the dialog box 2200. One skilled in the art will recognize that the dialog box of FIG. 22 is merely exemplary of one mechanism for defining, specifying, editing and/or customizing parameters and settings of an object component of a model, and that the invention is not limited to the illustrated configuration. Any suitable mechanism for allowing a user to specify, edit and/or customize parameters and settings of a graphical object or component of a model, such as a block diagram, may be used in accordance with the teachings of the invention.

After the user provides a specification for a block or other component of an event-driven discrete event execution graphical model, the model manager may automatically update a graphical representation of the block or other component of the event-driven discrete event execution graphical model according to the user-defined specification. For example, for a specification directed to a subset of ports on a block the modeling manager updates the graphical representation of the subset of ports of the block.

Figure 23:
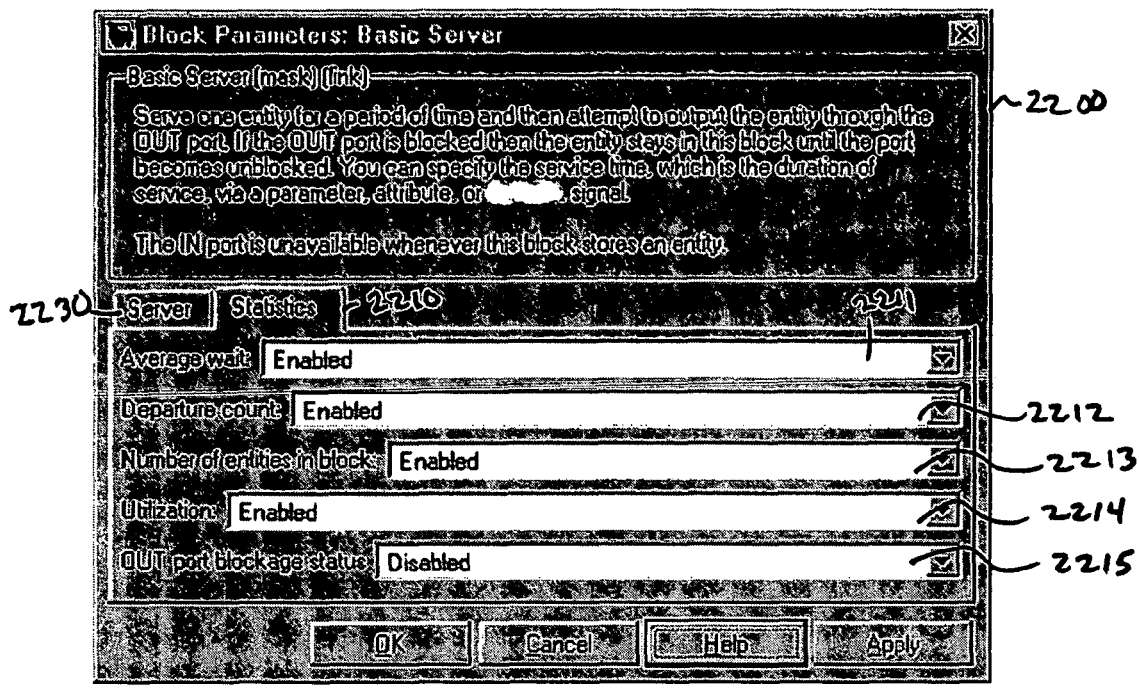
FIG. 23 illustrates the dialog box of FIG. 22 after receiving a user-defined specification that enables selected ports on the block.
Figure 24:
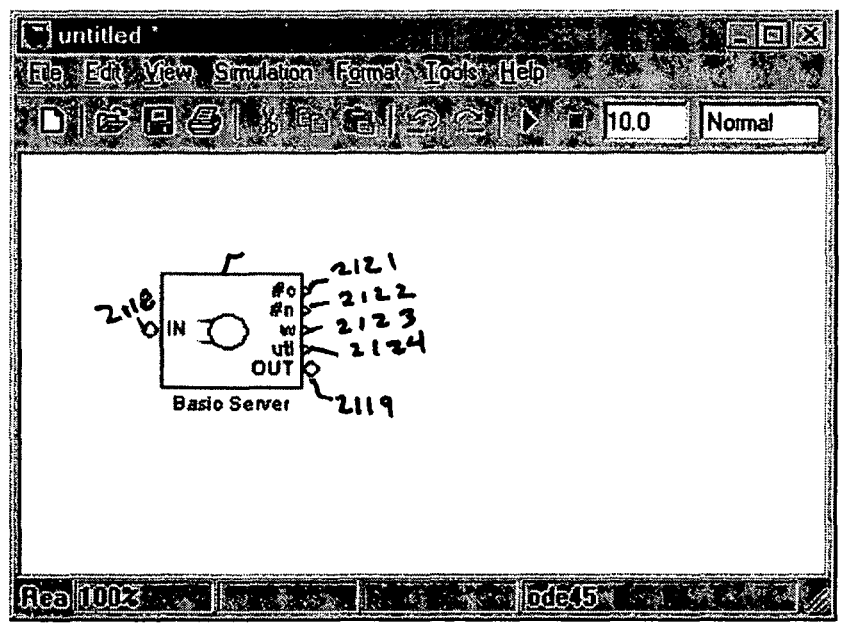
FIG. 24 illustrates a server block after applying the specifications defined in the dialog box of FIG. 23.

The illustrative block properties dialog box 2200 includes a number of panes including different fields for allowing a user to specify different attributes, settings and properties of the block. One skilled in the art will recognize that the invention is not limited to the illustrated mechanism and that the dialog box may have alternate configurations for receiving user-defined specifications. The illustrative block properties dialog box includes a statistics pane 2210, which is the active pane in the embodiment shown in FIG. 22. The statistics pane 2210 includes a plurality of fields to allow the user to enable statistics and add ports to the server that track statistics for the entities served by the associated server over a selected period of time. For example, the average wait field 2211 allows a user to enable or disable a port that outputs a signal indicative of the average wait for each entity served by the server during an execution. The departure count field 2212 allows a user to enable or disable a port that outputs a signal indicative of the number of entities that have been output by the associated server block over a selected period of time. A number of entities field 2213 allows a user to enable or disable a port that produces a signal indicative of a number of entities within the associated server block. A utilization field 2214 allows a user to enable or disable a port that outputs a signal indicative of the fraction of the time the block spends doing useful work, i.e. the total time that the block is busy holding an entity divided by the total time of the execution. An output port blockage status field 2215 allows a user to enable or disable a port that produces a signal indicative of whether the output port of the associated server is blocked or unblocked. For example, in the example shown in FIG. 23, the average wait field 2211, the departure count field 2212, the number of entities field 2213, the utilization field 2214 and the output port blockage status field 2215 of the dialog box 2200 are all enabled to add ports to the server block 2110, as shown in FIG. 24. In response to the user specifying the selected fields using the dialog box 2200, the event modeling manager adds ports 2121, 2122, 2123 and 2124 and 2125 to the graphical representation of the server block 2110. Port 2121 outputs a signal indicative of the average wait for each entities served by the server during an execution. Port 2122 outputs a signal indicative of the number of entities that have been output by the associated server block over a selected period of time. Port 2123 produces a signal indicative of a number of entities within the associated server block. Port 2124 outputs a signal indicative of the fraction of the time the block spends doing useful work. Port 2125 that produces a signal indicative of whether the output port of the associated server is blocked or unblocked. The settings on the dialog box prompts visibility in the graphical representation of the block, as indicated by the port label associated with each port.

In another embodiment of the invention, the specification may enable a port specifically configured for a selected function. For example, the specification may instruct the program to enable a port for a control signal for a block. In another embodiment, the specification may enable a port for an entity path for a block. In another embodiment, the user may enable a trigger, such as a Simulink® trigger, for a block using the specification. The specification may also be used to enable a function call port, a trigger-callable port, a function callable port or other suitable port for a block.

As shown, the dialog box 2200 further includes a server pane 2230 for allowing a user to specify general properties of the server block, such as the service time for each entity. One skilled in the art will recognize that the dialog box 2200 may be used to specify any selected characteristic of an associated block.

The user can launch or activate the dialog box for a selected block by double-clicking or right-clicking on the block icon using a mouse or through other suitable means known in the art.

In another embodiment of the invention, multiple dialog boxes, each displaying one or more fields for receiving the specification from the user may be provided. A first dialog box may be used to override the behavior of a second dialog box.

The illustrated block properties dialog boxes are exemplary of suitable interfaces for allowing a user to specify, define or edit properties of an object or component, such as a block, in a model, such as a block diagram. Any suitable interface used to specify, define or edit properties of a selected object or component in a model created within a graphical modeling environment.

Figure 25:
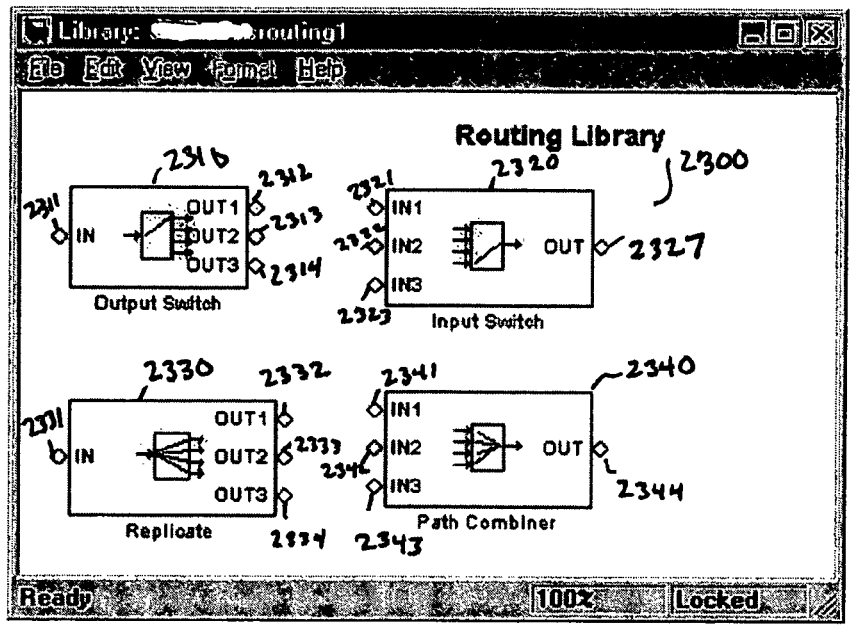
FIG. 25 illustrates a portion of a block library in a DES environment for storing switching blocks in an initial state.

A dialog box or other suitable user interface may be used to specify parameters for any selected block in a DES environment. For example, FIG. 25 illustrates a portion of a routing library 2300 in a DES environment including a plurality of switch blocks, which are used for routing entities through the graphical model. As shown, each block exists in an initial state in the routing library 2300. An output switch block 2310 switches an entity from an input port to a selected output port in a group of output ports on the output switch. In the illustrated initial state, an output switch block 2310 includes a single input port 2311 and three output ports 2312, 2313, 2314. An input switch block 2320 receives an entity from a selected input port and passes the entity to an output port. In the illustrated initial state, the input switch block 2320 includes three input ports 2321, 2322, 2323 and a single output port 2327. A replicate block 2330 receives an entity via an input port 2331, replicates the entity, and passes each replicated entity to a plurality of output ports. In the initial state in the block library, the replicate block 2330 includes a single input port 2331 and three output ports 2332, 2333, 2334. A path combiner block 2340 combines entities received from different input ports into single output port. In the initial state, the path combiner block includes three input ports 2341, 2342, 2343 and a single output port 2344.

Figure 26:
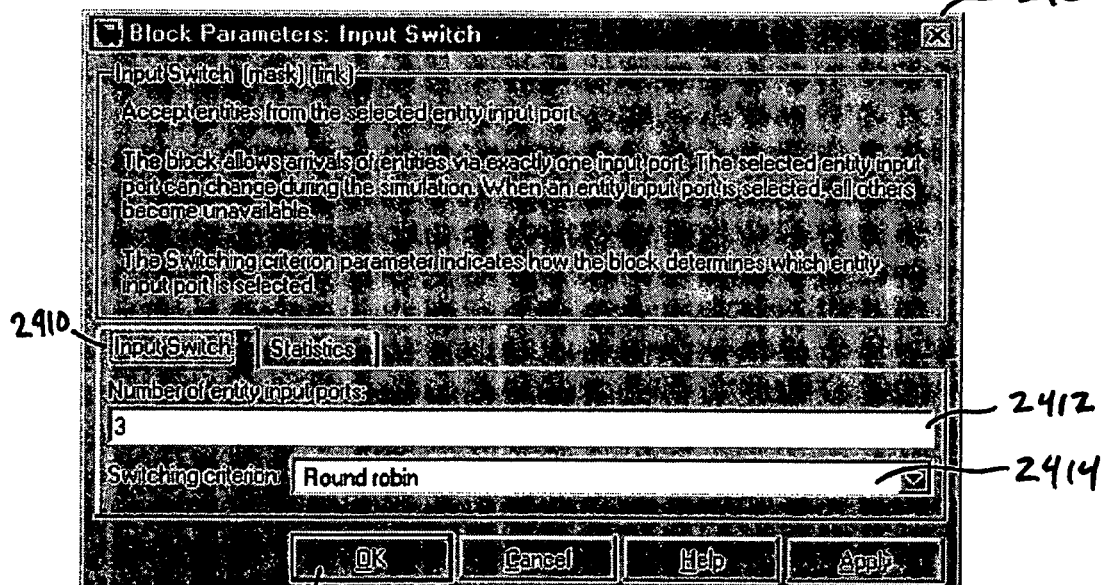
FIG. 26 illustrates a dialog box for receiving user-defined parameters for an input switch block in a DES environment according to an illustrative embodiment of the invention.

When building a block diagram in a DES environment, a user can customize each block according to the requirements of the system being modeled. In the illustrative embodiment, a user can customize each switch block shown in FIG. 25 using a dialog box associated with the selected switch. For example, while the input switch 2320 includes three input ports in the initial state, the user can add, remove or otherwise modify the input ports using a dialog box, such as the dialog box 2400 shown in FIG. 26. As shown, the dialog box 2400 for the selected input switch 2310 includes an input switch pane 2410 including fields for specifying parameters relating to the input ports of the input switch 2310. The input switch pane 2410 includes a number field 2412 for allowing the user to specify the number of input ports for the associated input switch and a switching criterion field 2414 for allowing the user to select particular criteria for switching between the different input ports. Examples of suitable algorithms for switching between the different ports include round robin, random and other suitable algorithms.

Figure 27:
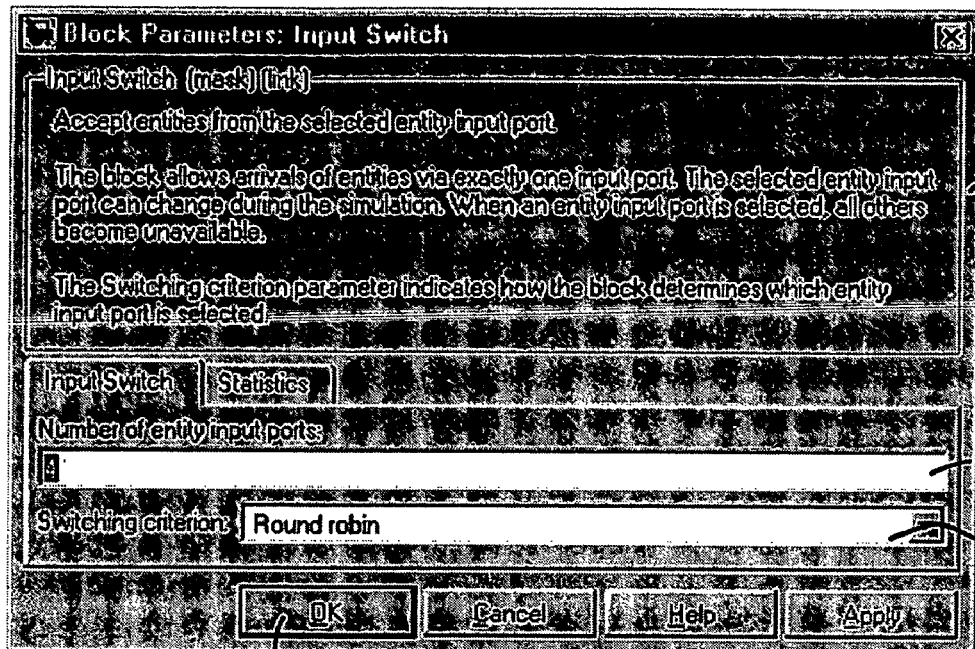
FIG. 27 illustrates the dialog box of FIG. 26 after receiving a user-defined specification that changes the number of input ports for the associated input switch block.
Figure 28:
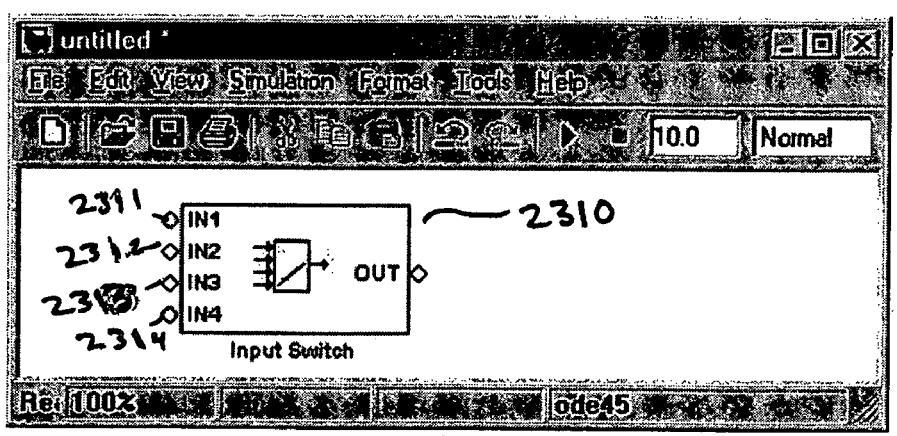
FIG. 28 illustrates an input switch block after application of the specification defined in the dialog box of FIG. 27.

The user can add ports to the selected block by altering the settings on a dialog box associated with the block. As shown in FIG. 27, the user can update a value in the number field 2412 to "4". When the user instructs the event modeling manager to apply the setting from the dialog box 2400 to the associated input switch block, for example, by highlighting and selecting the "ok" button 2401, the DES event modeling manager changes the number of input ports to four. As shown in FIG. 28, the graphical representation of the selected input switch port 2310 includes a fourth input port 2314 after the user saves the parameters.

Figure 29:
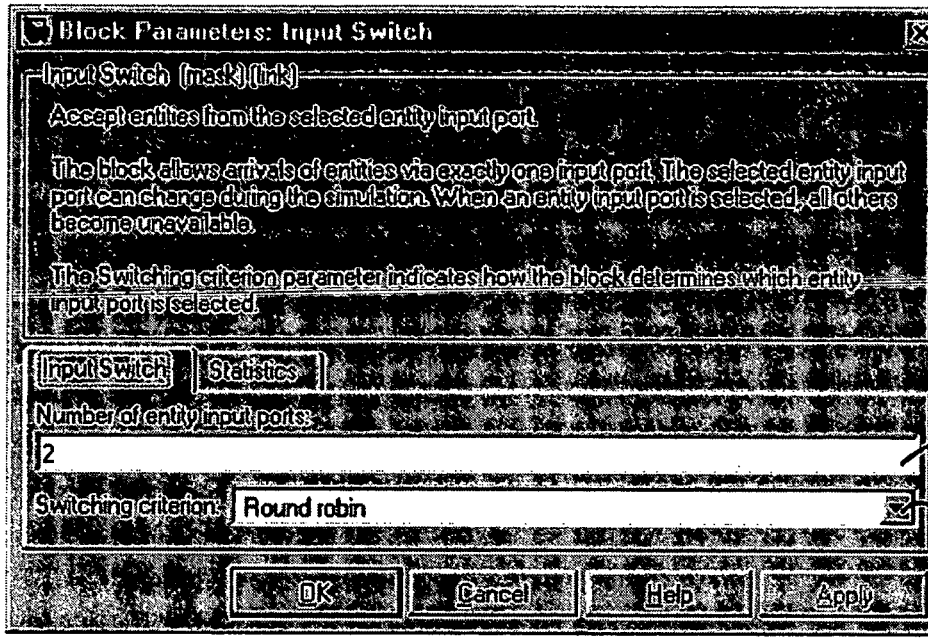
FIG. 29 illustrates the dialog box of FIG. 26 after receiving a user-defined specification that reduces the number of input ports for the associated input switch block.
Figure 30:
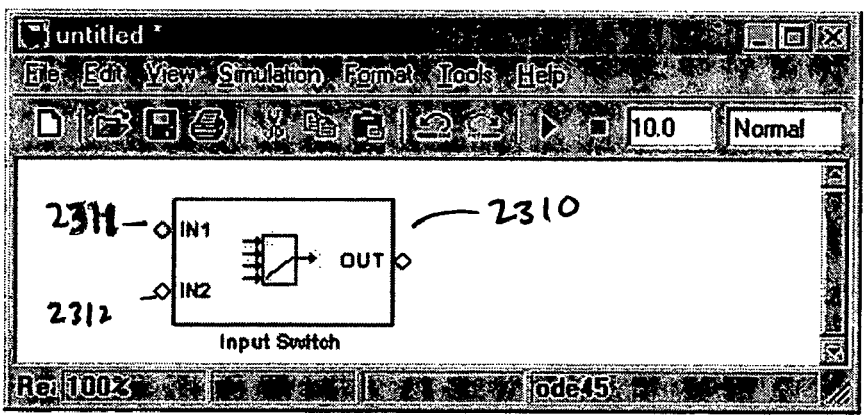
FIG. 30 illustrates an input switch block after application of the specification defined in the dialog box of FIG. 29.

The user can also remove ports from a selected block using a dialog box. For example, as shown in FIG. 29, the user can reduce the number of ports of the input switch block 2310 by changing the value of the number field to "2" and instructing the program to apply the settings in the dialog box. As shown in FIG. 30, the settings, when applied removes two ports 2314, 2313 from the input switch block 2310, leaving only ports 2311 and 2312.

FIG. 31 is a flowchart illustrating the steps involved in specifying a component in an event-driven discrete event execution graphical model according an embodiment of the invention. A first step 312 involves receiving a specification for a component of an event-driven discrete event execution graphical model prior to run-time. The event-driven discrete event execution graphical model preferably includes a first component, such as a block, able to support at least one entity passing therethrough holding a value of arbitrary data type. In one embodiment, as described above, the specification is for a subset of ports of the first component of the event-driven discrete event execution graphical model. A second step 314 comprises automatically updating a graphical representation of the component of the event-driven discrete event execution graphical model in response to the specification. For example when the specification is for a subset of ports, step 314 involves updating the graphical representation of the subset of ports according to the specification.

FIG. 32 is a flowchart illustrating the steps involved in building a graphical model in an event-driven discrete event execution environment according to an illustrative embodiment of the invention. Step 322 comprises displaying a user interface for prompting a user to provide a specification for an event-driven discrete event execution block prior to run-time, for example for a subset of ports of an event-driven discrete event execution block. Step 324 comprises automatically updating a graphical representation of the event-driven discrete event execution block in response to the specification.

Figure 33:
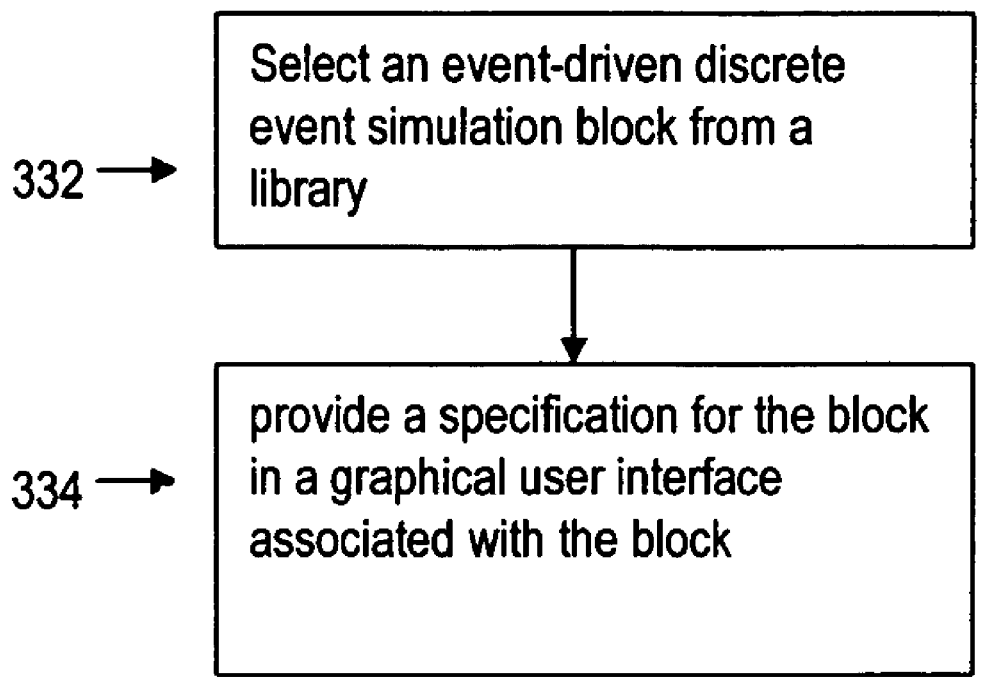
FIG. 33 is a flowchart illustrating the steps taken by a user to define a block in an event-driven discrete event execution environment according to an illustrative embodiment of the invention.

FIG. 33 is a flowchart illustrating the steps taken by a user to define a block in an event-driven discrete event execution environment according to an illustrative embodiment of the invention. In a first step 332, the user selects an event-driven discrete event execution block from a library. In a second step 334, the user provides a specification for the block in a graphical user interface associated with the event-driven discrete event execution block. For example, step 334 may comprise providing a specification for a subset of ports for the block in a graphical user interface associated with the event-driven discrete event execution block.

In addition to controlling the number of ports on a DES block, a dialog box can be used to control other parameters of a DES block.

A block specification may be created within a block diagram model or independently of a model, using a user-defined data (UDD) class based approach. A specification for a block, which may be defined using a dialog box, as described above, may be saved in a library within the diagramming program and called by the user when needed. The specification may be saved with an associated block diagram model that implements the block. Alternatively, a specification may be saved independently of a block diagram model and subsequently associated with a block diagram model during construction of the block diagram.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. In an event-driven graphical discrete event execution environment, a method comprising:
providing the event-driven discrete event execution graphical model having a first component able to support at least one entity passing therethrough, the first component having a port for inputting the at least one entity into the first component and a port for outputting the at least one entity from the first component;
receiving a specification of one or more parameters of the first component, the one or more parameters enabling one or more additional ports to be added to the first component or removed from the first component, each of the one or more additional ports being used to at least one of:
input a signal into the first component that is related to processing the at least one entity at the first component, and
output a signal from the first component that is related to processing the at least one entity at the first component; and
with a discrete event execution modeling manager automatically updating a graphical representation of the first component by adding the one or more additional ports to the first component or removing the one or more additional ports from the first component, the one or more additional ports being added or removed based on and in response to the received specification of the one or more parameters, the updated graphical representation of the first component having at least the port for inputting the at least one entity into the first component and the port for outputting the at least one entity from the first component.

2. The method of claim 1, further comprising saving the specification of the one or more parameters in memory.

3. The method of claim 1, wherein the first component is an event-driven block, and the specification of the one or more parameters explicitly indicates a number of additional ports to be added to the event-driven block or removed from the event-driven block.

4. The method of claim 1, wherein the first component has an initial state when stored in a library and the specification of the one or more parameters alters the initial state.

5. The method of claim 1, wherein the specification is defined by a user in a dialog box displaying one or more fields for receiving the specification of the one or more parameters from the user.

6. The method of claim 1, wherein the specification of the one or more parameters is defined by a user in multiple dialog boxes, each displaying one or more fields for receiving the specification of the one or more parameters from the user, wherein a first dialog box is used to override behavior of a second dialog box.

7. The method of claim 1, wherein the first component is an event-driven block and the specification of the one or more parameters enables a port, for tracking one or more statistics relating to one or more entities processed by the event-driven block during a simulation, to be added to the block.

8. The method of claim 1, wherein the first component is an event-driven block and the specification of the one or more parameters enables a port, for handling a control signal for the block, to be added to the block.

9. The method of claim 1, wherein the first component is an event-driven block and wherein the specification of the one or more parameters enables a port, for interfacing an entity path with the block, to be added to the block.

10. The method of claim 1, wherein the first component is an event-driven block and wherein the specification of the one or more parameters enables a port, for handling a trigger signal for the block, to be added to the block.

11. The method of claim 1, wherein the first component is an event-driven block and the specification of the one or more parameters enables a port, for handling a function call signal for the block, to be added to the block.

12. The method of claim 1, wherein the first component is an event-driven block and the specification of the one or more parameters enables a trigger-callable port to be added to the block.

13. The method of claim 1, wherein the first component is an event-driven block and the specification of the one or more parameters enables a port that is callable by a function call to be added to the block.

14. The method of claim 1, wherein the first component is an event-driven block and an added port passes a time-based signal from the event-driven block during a simulation.

15. The method of claim 1, wherein the first component is an event-driven block and an added port passes a data-flow based signal that is mapped to time from the event-driven block during a simulation.

16. The method of claim 1, wherein the specification enables a port for tracking a state relating to the at least one entity processed by the first component during a simulation, to be added to the first component.

17. The method of claim 1, wherein the specification of the one or more parameters enables a port, for tracking a state of the first component independent of the at least one entity processed by the first component during a simulation, to be added to the first component.

18. The method of claim 1, wherein the event-driven graphical discrete event execution environment is a hybrid environment including discrete event-driven components and one of discrete time-driven components, continuous time-driven components, state-based components, and dataflow components mapped to time.

19. The method of claim 1, wherein the at least one entity is capable of holding entities of at least two different data types.

20. A method of building a graphical model in an event-driven graphical discrete event execution environment, comprising:
displaying a user interface for prompting a user to provide a specification of one or more parameters of an event-driven discrete event execution block in the graphical model, the event-driven discrete event execution block being able to support at least one entity passing therethrough, the event-driven discrete event execution block having a port for inputting the at least one entity into the event-driven discrete event execution block and a port for outputting the at least one entity from the event-driven discrete event execution block, the one or more parameters enabling one or more additional ports to be added to the block or removed from the block,
each of the one or more additional ports added or removed being used to at least one of input to the event-driven discrete event execution block or output from the event-driven discrete event execution block a signal related to processing the at least one entity at the event-driven discrete event execution block;
receiving the specification of the one or more parameters via the displayed user interface; and
automatically updating a graphical representation of the event-driven discrete event execution block to add the one or more additional ports to the event-driven discrete event execution block or remove the one or more additional ports from the event-driven discrete event execution block based on the specification of the one or more parameters, the updated event-driven discrete event execution block having at least the port for inputting the at least one entity into the event-driven discrete event execution block and the port for outputting the at least one entity from the event-driven discrete event execution block.

21. The method of claim 20, wherein automatically updating further comprises automatically setting one of a visibility and a color of a graphical representation of one or more ports of the event-driven discrete event execution block in an event-driven discrete event execution graphical model in response to the specification of the one or more parameters.

22. The method of claim 20, wherein the user interface is a dialog box displaying one or more fields for receiving the specification of the one or more parameters from the user.

23. The method of claim 20, wherein the specification of the one or more parameters defines a number of ports on the event-driven discrete event execution block.

24. In an event-driven graphical discrete event execution environment, a method comprising:
selecting an event-driven discrete event execution block from a library, the event-driven discrete event execution block being able to support at least one entity passing therethrough, the event-driven discrete event execution block having a port for inputting the at least one entity into the event-driven discrete event execution block and a port for outputting the at least one entity from the event-driven discrete event execution block; and
providing a specification of one or more parameters of the block in a graphical user interface associated with the event-driven discrete event execution block, the one or more parameters enabling one or more additional ports to be added to the block or removed from the block, each of the one or more additional ports added or removed being used to at least one of:
input to the first component a signal related to processing the at least one entity at the first component, and
output from the first component a signal related to processing the at least one entity at the first component,
the specification of the one or more parameters being used by the event-driven graphical discrete event execution environment to update block, the updating including at least one of:
adding one or more additional ports to the block, and
removing one or more additional ports from the block,
the updated block having at least the port for inputting the at least one entity into the event-driven discrete event execution block and the port for outputting the at least one entity from the event-driven discrete event execution block.

25. The method of claim 24, wherein the at least one entity is capable of holding entities of at least two different data types.

26. A medium storing computer executable instructions for use in an event-driven graphical discrete event execution environment on an electronic device, the medium storing instructions executable using the electronic device for performing a method comprising:
providing an event-driven discrete event execution graphical model having a first component able to support at least one entity passing therethrough, the first component having a port for inputting the at least one entity into the first component and a port for outputting the at least one entity from the first component;
receiving a specification of one or more parameters of the first component, one or more of the parameters enabling one or more additional ports to be added to the first component or removed from the first component, each of the one or more additional ports being used to at least one of:

input a signal into the first component that are related to processing the at least one entity at the first component, and output a signal from the first component that are related to processing the at least one entity at the first component; and with a discrete event execution modeling manager automatically updating a graphical representation of the first component by adding the one or more additional ports to the first component or removing the one or more additional ports from the first component, the one or more additional ports being added or removed based on and in response to the specification of the one or more parameters, the updated first component having at least the port for inputting the at least one entity into the first component and the port for outputting the at least one entity from the first component.

27. The medium of claim 26, wherein the at least one entity is capable of holding entities of at least two different data types.

28. A medium storing computer executable instructions for use in an event-driven discrete event execution environment on an electronic device, the medium storing instructions executable using the electronic device for performing a method comprising:

displaying a user interface for prompting a user to provide a specification of one or more parameters of an event-driven discrete event execution block, the event-driven discrete event execution block being able to support at least one entity passing therethrough, the event-driven discrete event execution block having a port for inputting the at least one entity into the event-driven discrete event execution block and a port for outputting the at least one entity from the event-driven discrete event execution block, the one or more parameters enabling one or more additional ports to be added to the block or removed from the block, each of the one or more additional ports added or removed being used to at least one of input to the event-driven discrete event execution block or output from the event-driven discrete event execution block a signal related to processing the at least one entity at the event-driven discrete event execution block;

receiving the specification of the one or more parameters via the displayed user interface; and automatically updating a graphical representation of the event-driven discrete event execution block to add the one or more additional ports to the event-driven discrete event execution block or remove the one or more additional ports from the event-driven discrete event execution block based on the specification of the one or more parameters, the updated event-driven discrete event execution block having at least the port for inputting the at least one entity into the event-driven discrete event execution block and the port for outputting the at least one entity from the event-driven discrete event execution block.

29. The medium of claim 28, wherein the at least one entity is capable of holding entities of at least two different data types.

30. A medium storing computer executable instructions for use in an event-driven discrete event execution environment on an electronic device, the medium storing instructions executable using the electronic device for performing a method comprising:

selecting an event-driven discrete event execution block from a library, the event-driven discrete event execution block being able to support at least one entity passing therethrough, the event-driven discrete event execution block having a port for inputting the at least one entity into the event-driven discrete event execution block and a port for outputting the at least one entity from the event-driven discrete event execution block; and providing a specification of one or more parameters of the block in a graphical user interface associated with the event-driven discrete event execution block, the one or more parameters enabling one or more additional ports to be added to the block or removed from the block, each of the one or more additional ports added or removed being used to at least one of:

input to the first component a signal related to processing the at least one entity at the first component, and output from the first component a signal related to processing the at least one entity at the first component, the specification of the one or more parameters being used by the event-driven graphical discrete event execution environment to update the block, the updating including at least one of:

adding one or more additional ports to the block, and removing one or more additional ports from the block, the updated block having at least the port for inputting the at least one entity into the event-driven discrete event execution block and the port for outputting the at least one entity from the event-driven discrete event execution block.

31. The medium of claim 30, wherein the at least one entity is capable of holding entities of at least two different data types.

32. A system comprising:

a display device for displaying a graphical model representing an event-driven system in an event-driven graphical discrete event execution environment, the graphical model having a block able to support at least one entity passing therethrough, the block having a port for inputting the at least one entity into the block and a port for outputting the at least one entity from the block; and a processor for:

receiving a specification of at least one parameter for the block in the graphical model, the at least one parameter enabling one or more additional ports to be added to the block or removed from the block, each of the one or more additional ports added or removed being used to at least one of input to the block or output from the block a signal related to processing one or more entities at the block, and updating the block based on the received specification of the at least one parameter, the updating including at least one of:

adding the one or more additional ports to the block, and removing the one or more additional ports from the block, the updated block having at least the port for inputting the at least one entity into the block and the port for outputting the at least one entity from the block.

33. The system of claim 32, wherein the at least one entity is capable of holding entities of at least two different data types.

34. The system of claim 32, wherein the processor further:

updates a graphical representation of the block in response to the specification of the at least one parameter.

35. The system of claim 34, wherein updating a graphical representation of the block further comprises removing a graphical representation of at least one port from the graphical representation.

36. The system of claim 34, wherein updating a graphical representation of the block further comprises adding a graphical representation of at least one port to the graphical representation.

37. The system of claim 32, wherein the at least one parameter comprises a number of ports in the block.

38. The system of claim 32, wherein the at least one parameter comprises an identification of a port added to or removed from the block.

39. The system of claim 32, wherein the at least one parameter comprises an identification of a triggered port added to or removed from the block.

40. The system of claim 32, wherein the at least one parameter comprises an identification of a function call port added to or removed from the block.

41. The system of claim 32, wherein the at least one parameter comprises an identification of trigger callable port added to or removed from the block.

42. The system of claim 32, wherein the at least one parameter comprises an identification of port callable by a function call added to or removed from the block.

* * * * *